(12) United States Patent
Kim

(10) Patent No.: US 12,382,535 B2
(45) Date of Patent: Aug. 5, 2025

(54) METHOD AND APPARATUS FOR TRANSMITTING AND RECEIVING DATA IN COMMUNICATION SYSTEM

(71) Applicant: ELECTRONICS AND TELECOMMUNICATIONS RESEARCH INSTITUTE, Daejeon (KR)

(72) Inventor: Jae Heung Kim, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 454 days.

(21) Appl. No.: 17/878,509

(22) Filed: Aug. 1, 2022

(65) Prior Publication Data

US 2022/0386407 A1  Dec. 1, 2022

Related U.S. Application Data

(62) Division of application No. 17/014,318, filed on Sep. 8, 2020, now abandoned.

(30) Foreign Application Priority Data

Oct. 2, 2019  (KR) .................. 10-2019-0122649
Oct. 24, 2019  (KR) .................. 10-2019-0133247
Nov. 25, 2019  (KR) .................. 10-2019-0152726
Aug. 21, 2020  (KR) .................. 10-2020-0105282

(51) Int. Cl.
*H04W 76/27* (2018.01)
*H04L 1/1812* (2023.01)
*H04W 68/02* (2009.01)
*H04W 72/23* (2023.01)
*H04W 74/0833* (2024.01)

(52) U.S. Cl.
CPC ........... *H04W 76/27* (2018.02); *H04L 1/1812* (2013.01); *H04W 68/02* (2013.01); *H04W 72/23* (2023.01); *H04W 74/0833* (2013.01)

(58) Field of Classification Search
CPC ..... H04W 76/27; H04W 68/02; H04W 72/23; H04W 74/0833; H04W 74/0836; H04W 74/0838; H04L 1/1812; H04L 1/1861
See application file for complete search history.

(56) References Cited

U.S. PATENT DOCUMENTS

2018/0049244 A1\*  2/2018  Lee ................. H04W 76/27
2018/0192271 A1  7/2018  Kim et al.
2018/0220369 A1  8/2018  Wu
(Continued)

FOREIGN PATENT DOCUMENTS

EP        3506708 A1    7/2019
KR  10-2014-0140622 A  12/2014
WO     2013/006219 A1   1/2013

*Primary Examiner* — Farid Seyedvosoghi
(74) *Attorney, Agent, or Firm* — LRK PATENT LAW FIRM

(57) ABSTRACT

An operation method of a base station in a communication system may include generating an indicator indicating transmission of small data; transmitting the indicator to a terminal; and transmitting the small data associated with the indicator to the terminal, wherein the terminal operates in a radio resource control (RRC) idle state or an RRC inactive state.

8 Claims, 7 Drawing Sheets

(56) References Cited

U.S. PATENT DOCUMENTS

| | | |
|---|---|---|
| 2018/0227851 A1 | 8/2018 | Kubota et al. |
| 2018/0270894 A1 | 9/2018 | Park et al. |
| 2019/0246372 A1 | 8/2019 | Qiang |
| 2019/0320353 A1 | 10/2019 | Kim et al. |
| 2021/0337602 A1* | 10/2021 | Liu .................... H04W 74/002 |
| 2022/0094495 A1* | 3/2022 | Wang .................... H04L 5/0064 |

* cited by examiner

METHOD AND APPARATUS FOR TRANSMITTING AND RECEIVING DATA IN COMMUNICATION SYSTEM

CROSS-REFERENCE TO RELATED APPLICATIONS

This application a division of U.S. patent application Ser. No. 17/014,318, filed on Sep. 8, 2020, which claims priority to Korean Patent Applications No. 10-2019-0122649 filed on Oct. 2, 2019, No. 10-2019-0133247 filed on Oct. 24, 2019, No. 10-2019-0152726 filed on Nov. 25, 2019, and No. 10-2020-0105282 filed on Aug. 21, 2020 with the Korean Intellectual Property Office (KIPO), the entire contents of which are hereby incorporated by reference.

BACKGROUND

1. Technical Field

The present disclosure relates to a technique for transmitting and receiving data in a communication system, and more specifically, to a technique for transmitting and receiving data occurring intermittently (e.g., data having a small size).

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

Meanwhile, a millimeter frequency band (e.g., a frequency band of 6 to 90 GHz) may be used to process rapidly increasing data. A small base station may be used to overcome deterioration of received signal performance due to path attenuation and reflection of radio waves in a high frequency band (e.g., millimeter frequency band). In a communication system supporting the millimeter frequency band, instead of a small base station supporting all functions of a radio protocol, a plurality of remote radio transmission/reception blocks (e.g., remote radio heads (RRHs)) and a centralized baseband processing function block may be deployed.

That is, all functions of a radio protocol can be distributedly supported in the remote radio transmission/reception blocks and the baseband processing function block in a functional split scheme. When the functional split technique is used, the communication system may be configured by a plurality of transmission and reception points (TRPs). The plurality of TRPs may perform communications using a carrier aggregation scheme, a dual connectivity scheme, a duplication transmission scheme, or the like. In the communication system supporting the functional split scheme, the carrier aggregation scheme, the dual connectivity scheme, a bi-casting scheme, the duplication transmission scheme, or the like, methods for transmitting and receiving data occurring intermittently (e.g., data having a small size) are required.

SUMMARY

Accordingly, exemplary embodiments of the present disclosure are directed to providing methods and apparatuses for transmitting and receiving data in a communication system.

According to a first exemplary embodiment of the present disclosure, an operation method of a base station in a communication system may comprise generating an indicator indicating transmission of small data; transmitting the indicator to a terminal; and transmitting the small data associated with the indicator to the terminal, wherein the terminal operates in a radio resource control (RRC) idle state or an RRC inactive state.

The indicator may be included in downlink control information (DCI) transmitted from the base station to the terminal.

A cyclic redundancy check (CRC) of the DCI including the indicator may be scrambled with a paging-radio network temporary identifier (P-RNTI) or a small-RNTI (SM-RNTI) configured for transmission of the small data.

The DCI may further include resource allocation information of the small data.

A transmission window may start at a time of transmitting the indicator, and the small data may be transmitted within the transmission window.

The operation method may further comprise receiving a hybrid automatic repeat request (HARQ) response for the small data from the terminal, wherein the HARQ response is received in a random access (RA) procedure.

The HARQ response may be a RA preamble, and a first RA preamble corresponding to acknowledgement (ACK) may be configured to be different from a second RA preamble corresponding to negative ACK (NACK).

The small data may be transmitted to the terminal on a paging channel (PCH) or a downlink-shared channel (DL-SCH).

A transmission resource of the small data may be configured within a bandwidth part (BWP) configured by the base station, and configuration information of the BWP may be transmitted from the base station to the terminal.

According to a second exemplary embodiment of the present disclosure, an operation method of a terminal in a communication system may comprise receiving downlink control information (DCI) from a base station by performing a monitoring operation in a physical downlink control channel (PDCCH) monitoring occasion; determining that small data to be transmitted to the terminal exists in the base station based on an indicator included in the DCI; and receiving the small data associated with the indicator from the base station, wherein the terminal operates in a radio resource control (RRC) idle state or an RRC inactive state.

The monitoring operation may be performed using a paging-radio network temporary identifier (P-RNTI) or a small-RNTI (SM-RNTI) configured for transmission of the small data.

The PDCCH monitoring occasion may be configured by the base station, and the DCI obtained from the PDCCH monitoring operation may further include resource allocation information of the small data.

A reception window may start at a time of receiving the indicator, a size of the reception window may be configured by the base station, and a reception operation of the small data may not be performed after the reception window ends.

The operation method may further comprise transmitting a hybrid automatic repeat request (HARQ) response for the small data to the base station in a random access (RA) procedure.

The HARQ response may be a RA preamble, a first RA preamble corresponding to acknowledgement (ACK) may be configured to be different from a second RA preamble corresponding to negative ACK (NACK), and configuration information of the first RA preamble and the second RA preamble may be received from the base station.

According to a third exemplary embodiment of the present disclosure, a terminal in a communication system may comprise a processor; a memory electronically communicating with the processor; and instructions stored in the memory, wherein when executed by the processor, the instructions cause the terminal to receive configuration information for a transmission and reception operation of small data from a base station; receive downlink control information (DCI) from the base station by performing a monitoring operation in a physical downlink control channel (PDCCH) monitoring occasion indicated by the configuration information; determine that small data to be transmitted to the terminal exists in the base station based on an indicator included in the DCI; and receive the small data associated with the indicator from the base station, wherein the terminal operates in a radio resource control (RRC) idle state or an RRC inactive state.

The configuration information may include a paging-radio network temporary identifier (P-RNTI) or a small-RNTI (SM-RNTI) configured for transmission of the small data, and the monitoring operation may be performed using the P-RNTI or the SM-RNTI.

The configuration information may include configuration information of a reception window, the reception window may start at a time of receiving the indicator, and the small data may be received within the reception window.

The configuration information may include configuration information of a pre-allocated downlink resource (PDR), and the small data may be received in the PDR.

The instructions may further cause the terminal to transmit a hybrid automatic repeat request (HARQ) response for the small data to the base station in a random access (RA) procedure.

According to exemplary embodiments of the present disclosure, the base station can transmit an indicator informing that a small packet exists to the terminal, and can transmit the small packet associated with indicator to the terminal. The terminal operating in a radio resource control (RRC) inactive state or an RRC idle state may receive the indicator from the base station, and may determine that the small packet to be transmitted to the terminal exists in the base station based on the indicator. The terminal operating in the RRC inactive state or the RRC idle state may receive the small packet from the base station without transition of the operation state. Accordingly, the small packet transmission/reception procedure can be quickly performed, and accordingly, performance of the communication system can be improved.

BRIEF DESCRIPTION OF DRAWINGS

Exemplary embodiments of the present disclosure will become more apparent by describing in detail embodiments of the present disclosure with reference to the accompanying drawings, in which.

Figure 1:
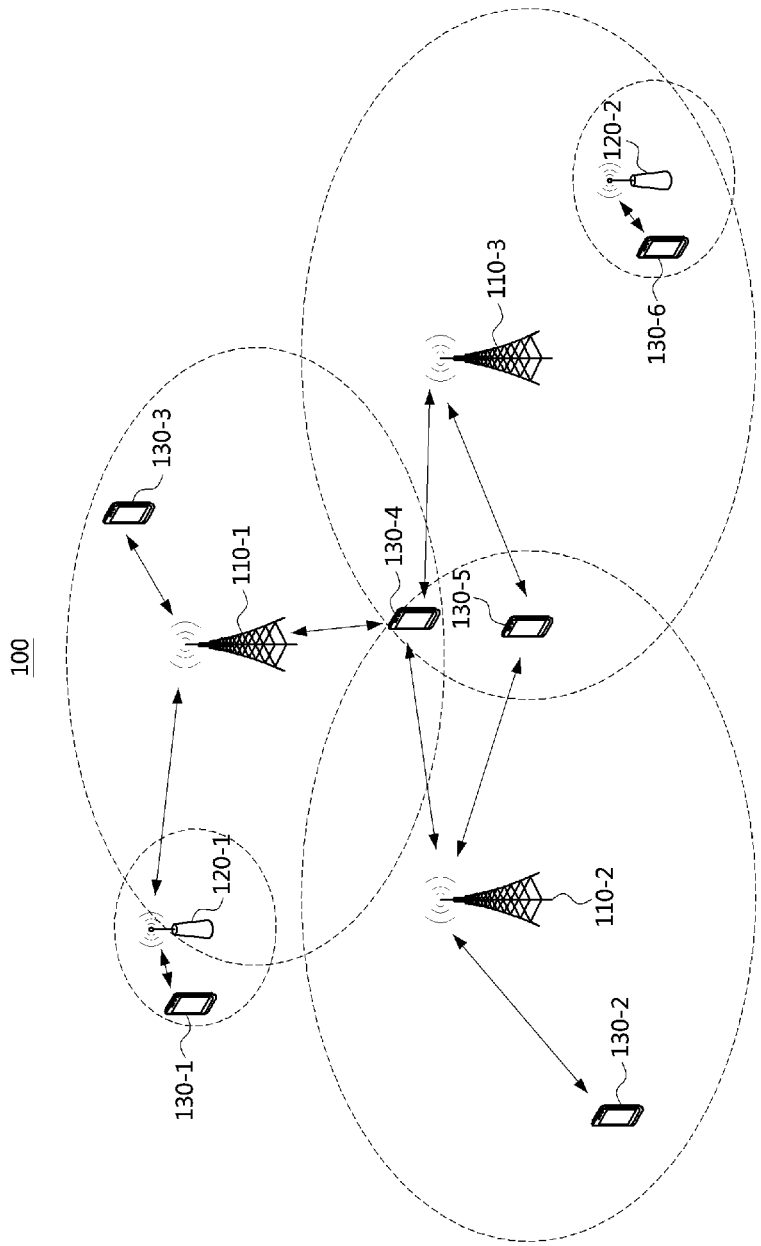
FIG. 1 is a conceptual diagram illustrating a first exemplary embodiment of a communication system.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication networks. Here, the communication system may be used in the same sense as a communication network.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Also, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
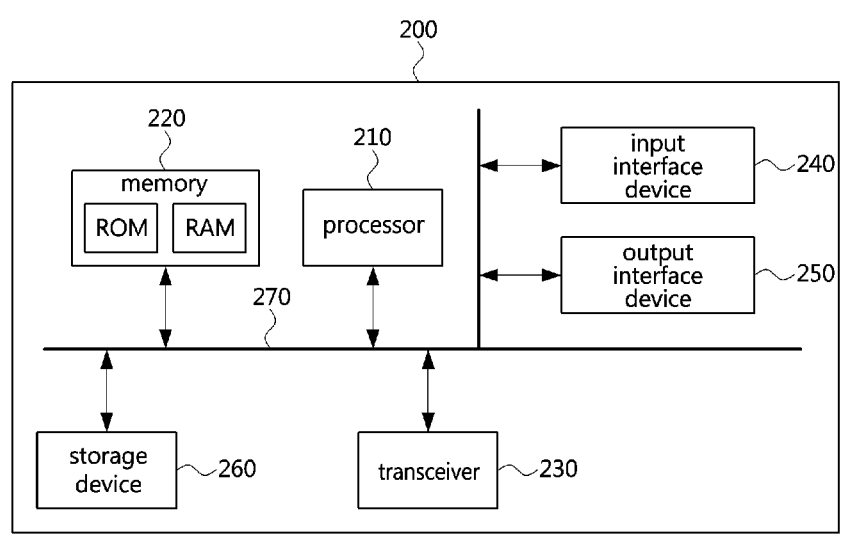
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for transmitting and receiving data in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In the following exemplary embodiments, a signaling message may be a signaling message including system information, an RRC signaling message, a MAC signaling message (e.g., MAC control element (CE)), and/or a PHY signaling message (e.g., downlink control information (DCI), uplink control information (UCI), sidelink control information (SCI)). The signaling message may be referred to as a 'control message'. In this case, the control message may be a control message including system information, an RRC control message, a MAC control message, and/or a PHY control message.

Meanwhile, in a communication system, a base station may perform all functions (e.g., remote radio transmission and reception function, baseband processing function, and the like) of a communication protocol. Alternatively, the remote radio transmission and reception function among all the functions of the communication protocol may be performed by a transmission reception point (TRP) (e.g., flexible TRP (f-TRP)), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of a backhaul link and a fronthaul link may be as follows. When a functional-split technique of the communication protocol is applied, the TRP may selectively perform some functions of the BBU or some functions of a medium access control (MAC) layer or a radio link control (RLC) layer.

Figure 3:
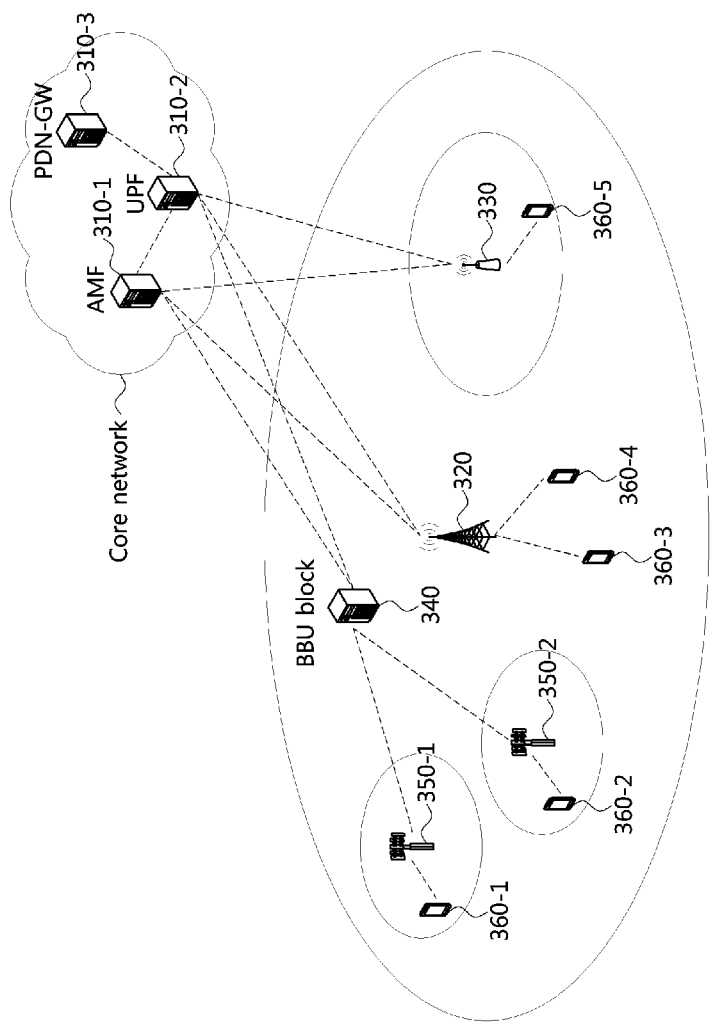
FIG. 3 is a conceptual diagram illustrating a second exemplary embodiment of a communication system.

FIG. 3 is a conceptual diagram illustrating a second exemplary embodiment of a communication system.

Referring to FIG. 3, a communication system may include a core network and an access network. The core network supporting the 4G communication may include an MME, an S-GW, a P-GW, and the like. The core network supporting the 5G communication may include an AMF 310-1, an UPF 310-2, a PDN-GW 310-3, and the like. The access network may include a macro base station 320, a small base station 330, TRPs 350-1 and 350-2, terminals 360-1, 360-2, 360-3, 360-4, and 360-5, and the like. The macro base station 320 or the small base station 330 may be connected to a termination node of the core network via a wired backhaul. The TRPs 350-1 and 350-2 may support the remote radio transmission and reception function among all the functions of the communication protocol, and the baseband processing function for the TRPs 350-1 and 350-2 may be performed by the BBU block 340. The BBU block 340 may belong to the access network or the core network. The communication nodes (e.g., MME, S-GW, P-GW, AMF, UPF, PDN-GW, macro base station, small base station, TRPs, terminals, and BBU block) belonging to the communication system may be configured identically or similarly to the communication node 200 shown in FIG. 2.

The macro base station 320 may be connected to the core network (e.g., AMF 310-1, UPF 310-2, MME, S-GW) using a wired backhaul link or a wireless backhaul link, and may provide communication services to the terminals 360-3 and 360-4 based on a communication protocol (e.g., 4G communication protocol, 5G communication protocol). The small base station 330 may be connected to the core network (e.g., AMF 310-1, UPF 310-2, MME, S-GW) using a wired backhaul link or a wireless backhaul link, and may provide communication services to the terminal 360-5 based on a communication protocol (e.g., 4G communication protocol, 5G communication protocol).

The BBU block 340 may be located in the AMF 310-1, the UPF 310-2, the MME, the S-GW, or the macro base station 320. Alternatively, the BBU block 340 may be located independently of each the AMF 310-1, the UPF 310-2, the MME, the S-GW, and the macro base station 320. For example, the BBU block 340 may be configured as a logical function block between the macro base station 320 and the AMF 310-1 (or UPF 310-2). The BBU block 340 may support the plurality of TRPs 350-1 and 350-2, and may be connected to each of the plurality of TRPs 350-1 and 350-2 using a wired fronthaul link or a wireless fronthaul link. That is, the link between the BBU block 340 and the TRPs 350-1 and 350-2 may be referred to as a 'fronthaul link'.

The first TRP 350-1 may be connected to the BBU block 340 via a wired fronthaul link or a wireless fronthaul link, and provide communication services to the first terminal 360-1 based on a communication protocol (e.g., 4G communication protocol, 5G communication protocol). The second TRP 350-2 may be connected to the BBU block 340 via a wired fronthaul link or a wireless fronthaul link, and provide communication services to the second terminal 360-2 based on a communication protocol (e.g., 4G communication protocol, 5G communication protocol).

The communication system including the access network, the Xhaul network, and the core network may be referred to as an 'integrated communication system'. The communication nodes (e.g., MME, S-GW, P-GW, AMF, UPF, BBU block, distributed unit (DU), central unit (CU), base station, TRP, terminal, and the like) belonging to the integrated communication system may be configured identically or similarly to the communication node 200 shown in FIG. 2. The communication nodes belonging to the Xhaul network may be connected using Xhaul links, and the Xhaul link may be a backhaul link or a fronthaul link.

Also, the UPF (or, S-GW) of the integrated communication system may refer to a termination communication node of the core network that exchanges packets (e.g., control information, data) with the base station, and the AIVIF (or, MME) of the integrated communication system may refer to a communication node in the core network, which performs control functions in a radio access section (or, interface) of the terminal. Here, each of the backhaul link, fronthaul link, Xhaul link, DU, CU, BBU block, S-GW, MME, AMF, and UPF may be referred to as a different term according to a function (e.g., function of the Xhaul network, function of the core network) of a communication protocol depending on a radio access technology (RAT).

In order to perform a mobility support function and a radio resource management function, the base station may transmit a synchronization signal (e.g., a synchronization signal/physical broadcast channel (SS/PBCH) block) and/or a reference signal. In order to support multiple numerologies, frame formats supporting symbols having different lengths may be configured. In this case, the terminal may perform a monitoring operation on the synchronization signal and/or reference signal in a frame according to an initial numerology, a default numerology, or a default symbol length. Each of the initial numerology and the default numerology may be applied to a frame format applied to radio resources in which a UE-common search space is configured, a frame format applied to radio resources in which a control resource set (CORESET) #0 of the NR communication system is configured, and/or a frame format applied to radio resources in which a synchronization symbol burst capable of identifying a cell in the NR communication system is transmitted.

The frame format may refer to information of configuration parameters (e.g., values of the configuration parameters, offset, index, identifier, range, periodicity, interval, duration, etc.) for a subcarrier spacing, control channel (e.g., CORESET), symbol, slot, and/or reference signal. The base station may inform the frame format to the terminal using system information and/or a control message (e.g., dedicated control message).

The terminal connected to the base station may transmit a reference signal (e.g., uplink dedicated reference signal) to the base station using resources configured by the corresponding base station. For example, the uplink dedicated reference signal may include a sounding reference signal (SRS). In addition, the terminal connected to the base station may receive a reference signal (e.g., downlink dedicated reference signal) from the base station in resources configured by the corresponding base station. The downlink dedicated reference signal may be a channel state information-reference signal (CSI-RS), a phase tracking-reference signal (PT-RS), a demodulation-reference signal (DM-RS), or the like. Each of the base station and the terminal may perform a beam management operation through monitoring on a configured beam or an active beam based on the reference signal.

For example, the first base station 611 may transmit a synchronization signal and/or a reference signal so that the first terminal 621 located within its service area can search for itself to perform downlink synchronization maintenance, beam configuration, or link monitoring operations. The first terminal 621 connected to the first base station 611 (e.g., serving base station) may receive physical layer radio resource configuration information for connection configuration and radio resource management from the first base station 611. The physical layer radio resource configuration information may mean configuration parameters included in RRC control messages of the LTE communication system or the NR communication system. For example, the resource configuration information may include PhysicalConfigDedicated, PhysicalCellGroupConfig, PDCCH-Config(Common), PDSCH-Config(Common), PDCCH-ConfigSIB1, ConfigCommon, PUCCH-Config(Common), PUSCH-Config(Common), BWP-DownlinkCommon, BWP-Uplink-Common, ControlResourceSet, RACH-ConfigCommon, RACH-ConfigDedicated, RadioResourceConfigCommon, RadioResourceConfigDedicated, ServingCellConfig, ServingCellConfigCommon, and the like.

The radio resource configuration information may include parameter values such as a configuration (or allocation) periodicity of a signal (or radio resource) according to a frame format of the base station (or transmission frequency), time resource allocation information for transmission, frequency resource allocation information for transmission, a transmission (or allocation) time, or the like. In order to support multiple numerologies, the frame format of the base station (or transmission frequency) may mean a frame format having different symbol lengths according to a plurality of subcarrier spacings within one radio frame. For example, the number of symbols constituting each of a mini-slot, slot, and subframe that exist within one radio frame (e.g., a frame of 10 ms) may be configured differently.

- Configuration information of transmission frequency and frame format of base station
  - Transmission frequency configuration information: information on all transmission carriers (i.e., cell-specific transmission frequency) in the base station, information on bandwidth parts (BWPs) in the base station, information on a transmission reference time or time difference between transmission frequencies of the base station (e.g., a transmission periodicity or offset parameter indicating the transmission reference time (or time difference) of the synchronization signal), etc.
  - Frame format configuration information: configuration parameters of a mini-slot, slot, and subframe having a different symbol length according to a subcarrier spacing
- Configuration information of downlink reference signal (e.g., channel state information-reference signal (CSI-RS), common reference signal (Common-RS), etc.)
  - Configuration parameters such as a transmission periodicity, transmission position, code sequence, or masking (or scrambling) sequence for a reference signal, which are commonly applied within the coverage of the base station (or beam).
- Configuration information of uplink control signal
  - Configuration parameters such as a sounding reference signal (SRS), uplink beam sweeping (or beam monitoring) reference signal, uplink grant-free radio resources (or, preambles), etc.
- Configuration information of physical downlink control channel (e.g., PDCCH)
  - Configuration parameters such as a reference signal for PDCCH demodulation, beam common reference signal (e.g., reference signal that can be received by all terminals within a beam coverage), beam sweeping (or beam monitoring) reference signal, reference signal for channel estimation, etc.
- Configuration information of physical uplink control channel (e.g., PUCCH)
- Scheduling request signal configuration information
- Configuration information for a feedback (acknowledgement (ACK) or negative ACK (NACK)) transmission resource in a hybrid automatic repeat request (HARD) procedure
- Number of antenna ports, antenna array information, beam configuration or beam index mapping information for application of beamforming techniques
- Configuration information of downlink signal and/or uplink signals (or uplink access channel resource) for beam sweeping (or beam monitoring)
- Configuration information of parameters for beam configuration, beam recovery, beam reconfiguration, or radio link re-establishment operation, beam change operation within the same base station, reception signal of a beam triggering handover execution to another base station, timers controlling the above-described operations, etc.

In case of a radio frame format that supports a plurality of symbol lengths for supporting multi-numerology, the configuration (or allocation) periodicity of the parameter, the time resource allocation information, the frequency resource allocation information, the transmission time, and/or the allocation time, which constitute the above-described information, may be information configured for each corresponding symbol length (or subcarrier spacing).

In the following exemplary embodiments, 'Resource-Config information' may be a control message including one or more parameters of the physical layer radio resource configuration information. In addition, the 'Resource-Config information' may mean attributes and/or configuration values (or range) of information elements (or parameters) delivered by the control message. The information elements (or parameters) delivered by the control message may be radio resource configuration information applied commonly to the entire coverage of the base station (or, beam) or radio resource configuration information allocated dedicatedly to a specific terminal (or, specific terminal group). A terminal group may include one or more terminals.

The configuration information included in the 'Resource-Config information' may be transmitted through one control message or different control messages according to the attributes of the configuration information. The beam index information may not express the index of the transmission beam and the index of the reception beam explicitly. For example, the beam index information may be expressed using a reference signal mapped or associated with the corresponding beam index or an index (or identifier) of a transmission configuration indicator (TCI) state for beam management.

Therefore, the terminal operating in the RRC connected state may receive a communication service through a beam (e.g., beam pair) configured between the terminal and the base station. For example, when a communication service is provided using beam configuration (e.g., beam pairing) between the base station and the terminal, the terminal may perform a search operation or a monitoring operation of a radio channel by using a synchronization signal (e.g., SS/PBCH block) and/or a reference signal (e.g., CSI-RS) of a beam configured with the base station, or a beam the can be received. Here, the expression that a communication service is provided through a beam may mean that a packet is transmitted and received through an active beam among one or more configured beams. In the NR communication system, the expression that a beam is activated may mean that a configured TCI state is activated.

The terminal may operate in the RRC idle state or the RRC inactive state. In this case, the terminal may perform a search operation (e.g., monitoring operation) of a downlink channel by using parameter(s) obtained from system information or common Resource-Config information. In addition, the terminal operating in the RRC idle state or the RRC inactive state may attempt to access by using an uplink channel (e.g., a random access channel or a physical layer uplink control channel). Alternatively, the terminal may transmit control information by using an uplink channel.

The terminal may recognize or detect a radio link problem by performing a radio link monitoring (RLM) operation. Here, the expression that a radio link problem is detected may mean that physical layer synchronization configuration or maintenance for a radio link has a problem. For example, the expression that a radio link problem is detected may mean that it is detected that the physical layer synchronization between the base station and the terminal is not maintained during a preconfigured time. When a radio link problem is detected, the terminal may perform a recovery operation of the radio link. When the radio link is not recovered, the terminal may declare a radio link failure (RLF) and perform a re-establishment procedure of the radio link.

The procedure for detecting a physical layer problem of a radio link, procedure for recovering a radio link, procedure for detecting (or declaring) a radio link failure, and procedure for re-establishing a radio link according to the RLM operation may be performed by functions of a layer 1 (e.g., physical layer), a layer 2 (e.g., MAC layer, RLC layer, PDCP layer, etc.), and/or a layer 3 (e.g., RRC layer) of the radio protocol.

The physical layer of the terminal may monitor a radio link by receiving a downlink synchronization signal (e.g., primary synchronization signal (PSS), secondary synchronization signal (SSS), SS/PBCH block) and/or a reference signal. In this case, the reference signal may be a base station common reference signal, beam common reference signal, or terminal (or terminal group) specific reference signal (e.g., dedicated reference signal allocated to a terminal (or terminal group)). Here, the common reference signal may be used for channel estimation operations of all terminals located within the corresponding base station or beam coverage (or service area). The dedicated reference signal may be used for a channel estimation operation of a specific terminal or a specific terminal group located within the base station or beam coverage.

Accordingly, when the base station or the beam (e.g., configured beam between the base station and the terminal) is changed, the dedicated reference signal for beam management may be changed. The beam may be changed based on the configuration parameter(s) between the base station and the terminal. A procedure for changing the configured beam may be required. The expression that a beam is changed in the NR communication system may mean that an index (or identifier) of a TCI state is changed to an index of another TCI state, that a TCI state is newly configured, or that a TCI state is changed to an active state. The base station may transmit system information including configuration information of the common reference signal to the terminal. The terminal may obtain the common reference signal based on the system information. In a handover procedure, synchronization reconfiguration procedure, or connection reconfiguration procedure, the base station may transmit a dedicated control message including the configuration information of the common reference signal to the terminal.

The configured beam information may include at least one of a configured beam index (or identifier), configured TCI state index (or identifier), configuration information of each beam (e.g., transmission power, beam width, vertical angle, horizontal angle), transmission and/or reception timing information of each beam (e.g., subframe index, slot index, mini-slot index, symbol index, offset), reference signal information corresponding to each beam, and reference signal identifier.

In the exemplary embodiments, the base station may be a base station installed in the air. For example, the base station may be installed on an unmanned aerial vehicle (e.g., drone), a manned aircraft, or a satellite.

The terminal may receive configuration information of the base station (e.g., identification information of the base station) from the base station through one or more of an RRC message, MAC message, and PHY message, and may identify a base station with which the terminal performs a beam monitoring operation, radio access operation, and/or control (or data) packet transmission and reception operation.

The result of the measurement operation (e.g., beam monitoring operation) for the beam may be reported through a physical layer control channel (e.g., PUCCH) and/or a MAC message (e.g., MAC CE, control PDU). Here, the result of the beam monitoring operation may be a measurement result for one or more beams (or beam groups). For example, the result of the beam monitoring operation may be a measurement result for beams (or beam groups) according to a beam sweeping operation of the base station.

The base station may obtain the result of the beam measurement operation or the beam monitoring operation from the terminal, and may change the properties of the beam or the properties of the TCI state based on the result of the beam measurement operation or the beam monitoring operation. The beam may be classified into a primary beam, a secondary beam, a reserved (or candidate) beam, an active beam, and a deactivated beam according to its properties. The TCI state may be classified into a primary TCI state, a secondary TCI state, a reserved (or candidate) TCI state, a serving TCI state, a configured TCI state, an active TCI state, and a deactivated TCI state according to its properties. Each of the primary TCI state and the secondary TCI state may be assumed to be an active TCI state and a serving TCI state. The reserved (or candidate) TCI state may be assumed to be a deactivated TCI state or a configured TCI state.

A procedure for changing the beam (or TCI state) property may be controlled by the RRC layer and/or the MAC layer. When the procedure for changing the beam (or TCI state) property is controlled by the MAC layer, the MAC layer may inform the higher layer of information regarding a change in the beam (or TCI state) property. The information regarding the change in the beam (or TCI state) property may be transmitted to the terminal through a MAC message and/or a physical layer control channel (e.g., PDCCH). The information regarding the change in the beam (or TCI state) property may be included in downlink control information (DCI) or uplink control information (UCI). The information regarding the change in the beam (or TCI state) property may be expressed as a separate indicator or field.

The terminal may request to change the property of the TCI state based on the result of the beam measurement operation or the beam monitoring operation. The terminal may transmit control information (or feedback information) requesting to change the property of the TCI state to the base station by using one or more of a PHY message, a MAC message, and an RRC message. The control information (or feedback information, control message, control channel) requesting to change the property of the TCI state may be configured using one or more of the configured beam information described above.

The change in the property of the beam (or TCI state) may mean a change from the active beam to the deactivated beam, a change from the deactivated beam to the active beam, a change from the primary beam to the secondary beam, a change from the secondary beam to the primary beam, a change from the primary beam to the reserved (or candidate) beam, or a change from the reserved (or candidate) beam to the primary beam. The procedure for changing the property of the beam (or TCI state) may be controlled by the RRC layer and/or the MAC layer. The procedure for changing the property of the beam (or TCI state) may be performed through partial cooperation between the RRC layer and the MAC layer.

When a plurality of beams are allocated, one or more beams among the plurality of beams may be configured as beam(s) for transmitting physical layer control channels. For example, the primary beam and/or the secondary beam may be used for transmission and reception of a physical layer control channel (e.g., PHY message). Here, the physical layer control channel may be a PDCCH or a PUCCH. The physical layer control channel may be used for transmission of one or more among scheduling information (e.g., radio resource allocation information, modulation and coding scheme (MCS) information), feedback information (e.g., channel quality indication (CQI), precoding matrix indicator (PMI), HARQ ACK, HARQ NACK), resource request information (e.g., scheduling request (SR)), result of the beam monitoring operation for supporting beamforming functions, TCI state ID, and measurement information for the active beam (or deactivated beam).

The physical layer control channel may be configured to be transmitted through the primary beam of downlink. In this case, the feedback information may be transmitted and received through the primary beam, and data scheduled by the control information may be transmitted and received through the secondary beam. The physical layer control channel may be configured to be transmitted through the primary beam of uplink. In this case, the resource request information (e.g., SR) and/or the feedback information may be transmitted and received through the primary beam.

In the procedure of allocating the plurality of beams (or the procedure of configuring the TCI states), the allocated (or configured) beam indexes, information indicating a spacing between the beams, and/or information indicating whether contiguous beams are allocated may be transmitted and received through a signaling procedure between the base station and the terminal. The signaling procedure of the beam allocation information may be performed differently according to status information (e.g., movement speed, movement direction, location information) of the terminal and/or the quality of the radio channel. The base station may obtain the status information of the terminal from the terminal. Alternatively, the base station may obtain the status information of the terminal through another method.

The radio resource information may include parameter(s) indicating frequency domain resources (e.g., center frequency, system bandwidth, PRB index, number of PRBs, CRB index, number of CRBs, subcarrier index, frequency offset, etc.) and parameter(s) indicating time domain resources (e.g., radio frame index, subframe index, transmission time interval (TTI), slot index, mini-slot index, symbol index, time offset, and periodicity, length, or window of transmission period (or reception period)). In addition, the radio resource information may further include a hopping pattern of radio resources, information for beamforming (e.g., beam shaping) operations (e.g., beam configuration information, beam index), and information on resources occupied according to characteristics of a code sequence (or bit sequence, signal sequence).

The name of the physical layer channel and/or the name of the transport channel may vary according to the type (or attribute) of data, the type (or attribute) of control information, a transmission direction (e.g., uplink, downlink, sidelink), and the like.

The reference signal for beam (or TCI state) or radio link management may be a synchronization signal (e.g., PSS, SSS, SS/PBCH block), CSI-RS, PT-RS, SRS, DM-RS, or the like. The reference parameter(s) for reception quality of the reference signal for beam (or TCI state) or radio link management may include a measurement time unit, a measurement time interval, a reference value indicating an improvement in reception quality, a reference value indicating a deterioration in reception quality, or the like. Each of the measurement time unit and the measurement time interval may be configured in units of an absolute time (e.g., millisecond, second), TTI, symbol, slot, frame, subframe, scheduling periodicity, operation periodicity of the base station, or operation periodicity of the terminal.

The reference value indicating the change in reception quality may be configured as an absolute value (dBm) or a relative value (dB). In addition, the reception quality of the reference signal for beam (or TCI state) or radio link management may be expressed as a reference signal received power (RSRP), a reference signal received quality (RSRQ), a received signal strength indicator (RSSI), a signal-to-noise ratio (SNR), a signal-to-interference ratio (SIR), or the like.

Meanwhile, in the NR communication system using a millimeter frequency band, flexibility for a channel bandwidth operation for packet transmission may be secured based on a bandwidth part (BWP) concept. The base station may configure up to 4 BWPs having different bandwidths to the terminal. The BWPs may be independently configured for downlink and uplink. That is, downlink BWPs may be distinguished from uplink BWPs. Each of the BWPs may have a different subcarrier spacing as well as a different bandwidth. For example, BWPs may be configured as follows.

Figure 4:
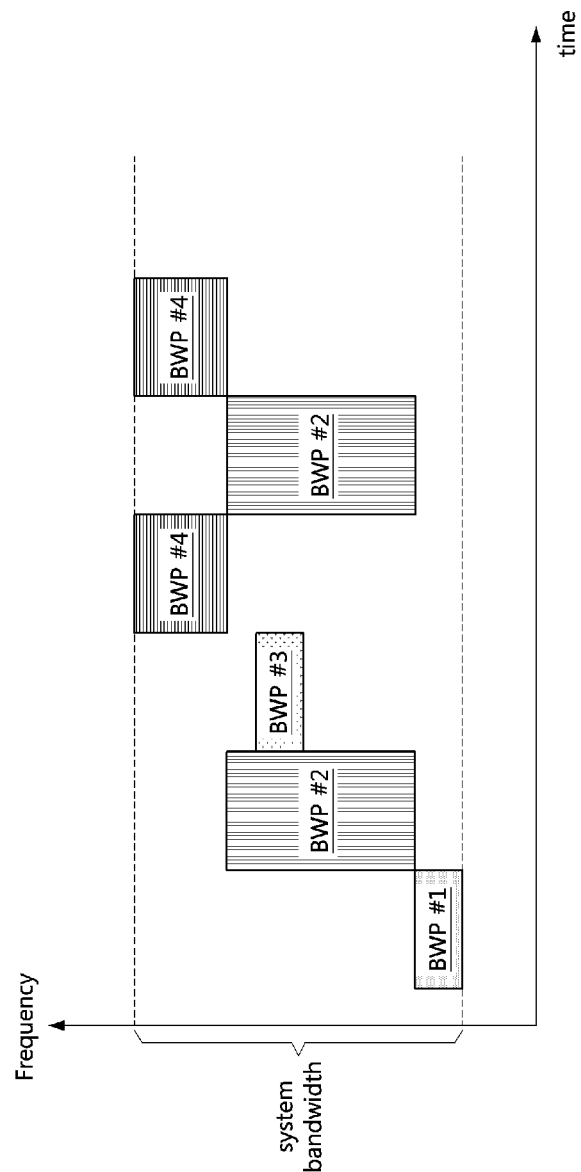
FIG. 4 is a conceptual diagram illustrating a first exemplary embodiment of a method for configuring bandwidth parts (BWPs) in a communication system.

FIG. 4 is a conceptual diagram illustrating a first exemplary embodiment of a method for configuring bandwidth parts (BWPs) in a communication system.

As shown in FIG. 4, a plurality of bandwidth parts (e.g., BWPs #1 to #4) may be configured within a system bandwidth of the base station. The BWPs #1 to #4 may be configured not to be larger than the system bandwidth of the base station. The bandwidths of the BWPs #1 to #4 may be different, and different subcarrier spacings may be applied to the BWPs #1 to #4. For example, the bandwidth of the BWP #1 may be 10 MHz, and the BWP #1 may have a 15 kHz subcarrier spacing. The bandwidth of the BWP #2 may be 40 MHz, and the BWP #2 may have a 15 kHz subcarrier spacing. The bandwidth of the BWP #3 may be 10 MHz, and the BWP #3 may have a 30 kHz subcarrier spacing. The bandwidth of the BWP #4 may be 20 MHz, and the BWP #4 may have a 60 kHz subcarrier spacing.

The BWPs may be classified into an initial BWP (e.g., first BWP), an active BWP (e.g., activated BWP), and a default BWP. The terminal may perform an initial access procedure (e.g., access procedure) with the base station in the initial BWP. One or more BWPs may be configured through an RRC connection configuration message, and one BWP among the one or more BWPs may be configured as the active BWP. Each of the terminal and the base station may transmit and receive packets in the active BWP among the configured BWPs. Therefore, the terminal may perform a monitoring operation on control channels for packet transmission and reception in the active BWP.

The terminal may switch the operating BWP from the initial BWP to the active BWP or the default BWP. Alternatively, the terminal may switch the operating BWP from the active BWP to the initial BWP or the default BWP. The BWP switching operation may be performed based on an indication of the base station or a timer. The base station may transmit information indicating the BWP switching to the terminal using one or more of an RRC message, a MAC message (e.g., MAC control element (CE)), and a PHY message (e.g., DCI). The terminal may receive the information indicating the BWP switching from the base station, and may switch the operating BWP of the terminal to a BWP indicated by the received information.

When a random access (RA) resource is not configured in the active uplink (UL) BWP in the NR communication system, the terminal may switch the operating BWP of the terminal from the active UL BWP to the initial UL BWP in order to perform a random access procedure. The operating BWP may be a BWP in which the terminal performs communication (e.g., transmission and reception operation of a signal and/or channel).

Measurement operations (e.g., monitoring operations) for beam (or TCI state) or radio link management may be performed at the base station and/or the terminal. The base station and/or the terminal may perform the measurement operations (e.g., monitoring operations) according to parameter(s) configured for the measurement operations (e.g., monitoring operations). The terminal may report a measurement result according to parameter(s) configured for measurement reporting.

When a reception quality of a reference signal according to the measurement result meets a preconfigured reference value and/or a preconfigured timer condition, the base station may determine whether to perform a beam (or, radio link) management operation, a beam switching operation, or a beam deactivation (or, activation) operation according to a beam blockage situation. When it is determined to perform a specific operation, the base station may transmit a message triggering execution of the specific operation to the terminal. For example, the base station may transmit a control message for instructing the terminal to execute the specific operation to the terminal. The control message may include configuration information of the specific operation.

When a reception quality of a reference signal according to the measurement result meets a preconfigured reference value and/or a preconfigured timer condition, the terminal may report the measurement result to the base station. Alternatively, the terminal may transmit to the base station a control message triggering a beam (or, radio link) management operation, a beam switching operation (or a TCI state ID change operation, a property change operation), or a beam deactivation operation (or a beam activation operation) according to a beam blockage situation. The control message may request to perform a specific operation.

A basic procedure for beam (or TCI state) management through the radio link monitoring may include a beam failure detection (BFD) procedure, a beam recovery (BR) request procedure, and the like for a radio link. An operation of determining whether to perform the beam failure detection procedure and/or the beam recovery request procedure, an operation triggering execution of the beam failure detection procedure and/or the beam recovery request procedure, and a control signaling operation for the beam failure detection procedure and/or the beam recovery request procedure may be performed by one or more of the PHY layer, the MAC layer, and the RRC layer.

The procedure for the terminal to access the base station (e.g., random access procedure) may be classified into an initial access procedure and a non-initial access procedure. The terminal operating in the RRC idle state may perform the initial access procedure. Alternatively, when there is no context information managed by the base station, the terminal operating in the RRC connected state may also perform the initial access procedure. The context information may include RRC context information, access stratum (AS) configuration information (e.g., AS context information), and the like. The context information may include one or more among RRC configuration information for the terminal, security configuration information for the terminal, PDCP information including a robust header compression (ROHC) state for the terminal, an identifier (e.g., cell-radio resource temporary identifier (C-RNTI)) for the terminal, and an identifier of the base station for which a connection configuration with the terminal has been completed.

The non-initial access procedure may refer to an access procedure performed by the terminal in addition to the initial access procedure. For example, the non-initial access procedure may be performed for an access request for transmission or reception data arrival at the terminal, connection resumption, resource allocation request, user (UE) request based information transmission request, link re-establishment request after a radio link failure (RLF), mobility function (e.g., handover function) support, secondary cell addition/change, active beam addition/change, or physical layer synchronization configuration.

The random access procedure may be performed based on the initial access procedure or the non-initial access procedure according to the operation state of the terminal.

Figure 5:
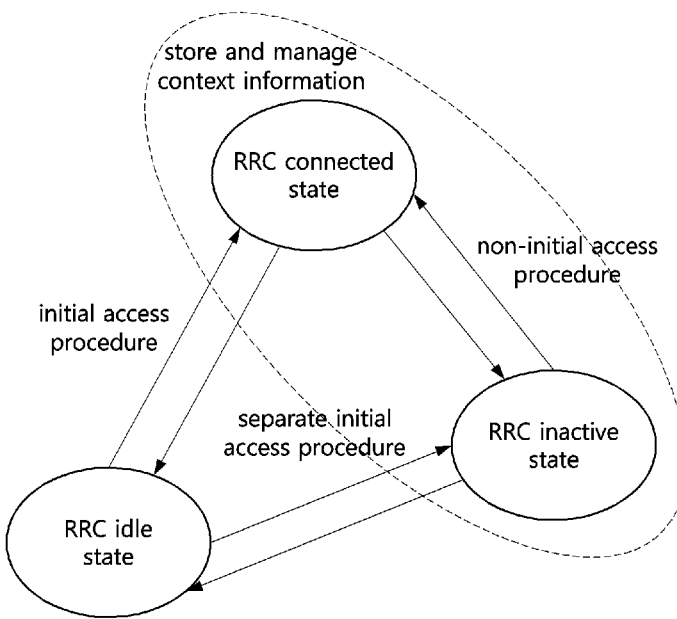
FIG. 5 is a conceptual diagram illustrating a first exemplary embodiment of operation states of a terminal in a communication system.

FIG. 5 is a conceptual diagram illustrating a first exemplary embodiment of operation states of a terminal in a communication system.

As shown in FIG. 5, operation states of the terminal may be classified into an RRC connected state, an RRC inactive state, and an RRC idle state. When the terminal operates in the RRC connected state or the RRC inactive state, a radio access network (RAN) (e.g., a control function block of the RAN) and the base station may store and manage RRC connection configuration information and/or context information (e.g., RRC context information, AS context information) of the corresponding terminal.

The terminal operating in the RRC connected state may receive configuration information of physical layer control channels and/or reference signals required for maintaining connection configuration and transmission/reception of data from the base station. The reference signal may be a reference signal for demodulating the data. Alternatively, the reference signal may be a reference signal for channel quality measurement or beamforming. Therefore, the terminal operating in the RRC connected state may transmit and receive the data without delay.

When the terminal operates in the RRC inactive state, mobility management functions/operations identical or similar to mobility management functions/operations supported in the RRC idle state may be supported for the corresponding terminal. That is, when the terminal operates in the RRC inactive state, a data bearer for transmitting and receiving data may not be configured, and functions of the MAC layer may be deactivated. Accordingly, the terminal operating in the RRC inactive state may transition the operation state of the terminal from the RRC inactive state to the RRC connected state by performing the non-initial access procedure to transmit data. Alternatively, the terminal operating in the RRC inactive state may transmit data having a limited size, data having a limited quality of service, and/or data associated with a limited service.

When the terminal operates in the RRC idle state, there may be no connection configuration between the terminal and the base station, and the RRC connection configuration information and/or context information (e.g., RRC context information, AS context information) of the terminal may not be stored in the RAN (e.g., a control function block of the RAN) and the base station. In order to transition the operation state of the terminal from the RRC idle state to the RRC connected state, the terminal may perform the initial access procedure. Alternatively, when the initial access procedure is performed, the operation state of the terminal may transition from the RRC idle state to the RRC inactive state according to determination of the base station.

The terminal may transition from the RRC idle state to the RRC inactive state by performing the initial access procedure or a separate access procedure defined for the RRC inactive state. When a limited service is provided to the terminal, the operation state of the terminal may transition from the RRC idle state to the RRC inactive state. Alternatively, depending on capability of the terminal, the operation state of the terminal may transition from the RRC idle state to the RRC inactive state.

The base station and/or the control function block of the RAN may configure condition(s) for transitioning to the RRC inactive sate by considering one or more of the type, capability, and service (e.g., a service currently being provided and a service to be provided) of the terminal, and may control the operation for transitioning to the RRC inactive state based on the configured condition(s). When the base station allows the transition to the RRC inactive state or when the transition to the RRC inactive state is configured to be allowed, the operation state of the terminal may be transitioned from the RRC connected state or the RRC idle state to the RRC inactive state.

Data having a small size (hereinafter referred to as 'small data') and/or a small size signaling message (hereinafter referred to as 'small signaling message') may occur intermittently. Each of the small data and the small signaling message may be referred to as a 'small packet (SM_Packet)'. When the small data and/or the small signaling message is generated in the base station, the base station may transmit the small data and/or the small signaling message to the terminal operating in the RRC idle state or the RRC inactive state. When the small data and/or the small signaling message is generated in the terminal, the terminal (e.g., the terminal operating in the RRC idle state or the RRC inactive state) may transmit the small data and/or the small signaling message to the base station. Here, the small data and/or the small signaling message may be transmitted through a paging procedure or a random access procedure.

Figure 6:
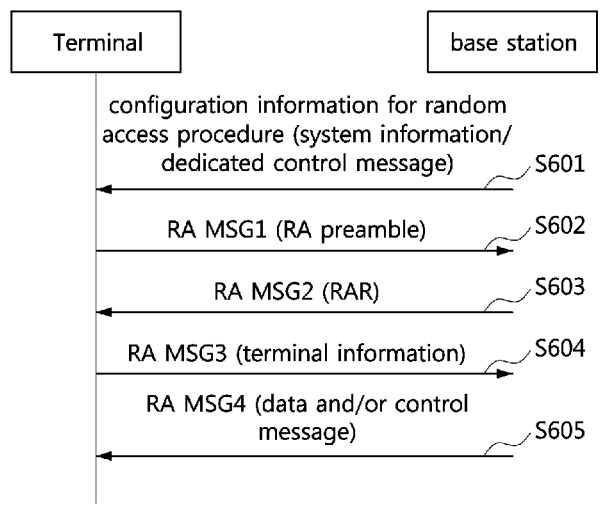
FIG. 6 is a sequence chart illustrating a first exemplary embodiment of a random access procedure in a communication system.

FIG. 6 is a sequence chart illustrating a first exemplary embodiment of a random access procedure in a communication system.

Referring to FIG. 6, a communication system may include a base station, a terminal, and the like. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. The base station and the terminal may be configured to be the same or similar to the communication node shown in FIG. 2. A random access procedure may be performed in four steps.

The base station may transmit system information and/or a control message including configuration information of a radio resource (e.g., uplink radio resource) for the random access procedure to the terminal (S601). The terminal may obtain the configuration information of the radio resource for the random access procedure by receiving the system information and/or control message from the base station. The system information may be common system information used for a plurality of base stations or base station-specific system information (e.g., cell-specific system information). The control message may be a dedicated control message.

The system information may be configured for each base station, for each beam group, or for each beam. The system information may include allocation information of the radio resource (e.g., uplink radio resource) for the random access procedure. The configuration information of the radio resource for the random access procedure may include one or more of transmission frequency information of the physical layer, system bandwidth information (or BWP configuration information), subcarrier spacing information, beam configuration information according to a beamforming technique (e.g., beam width, beam index), variable radio resource configuration information (e.g., radio resource reference value, offset) in the frequency and/or time domain, and inactive (or unused) radio resource region/interval information.

The terminal may transmit an RA message 1 (i.e., RA MSG1) including an RA preamble to the base station using the radio resource (e.g., physical random access channel (PRACH)) configured by the base station (S602). The message 1 including the RA preamble may be referred to as an 'RA MSG1' in the 4-step random access procedure, the RA preamble in the 4-step random access procedure may be referred to as a '4-step-RA preamble'.

The terminal may randomly select a code sequence (e.g., RA preamble, signature) defined for the random access procedure, and transmit the RA MSG1 including the selected code sequence. In a contention-based random access (CBRA) procedure, the terminal may randomly select the RA preamble. In a contention-free random access (CFRA) procedure, the base station may pre-allocate the RA preamble to the terminal. The pre-allocation of the RA preamble may mean that an index, masking information, etc. of the RA preamble for the RA MSG1 is allocated dedicatedly to the terminal. In this case, the terminal may perform the random access procedure (e.g., CFRA procedure) without contention with other terminals.

The base station may receive the RA MSG1 from the terminal. The base station may generate an RA MSG2 in response to the RA MSG1, and may transmit the RA MSG2 to the terminal (S603). In the 4-step random access procedure, the RA MSG2 may mean a message 2, a random access response (RAR), or an RAR message.

In the step S603, allocation information of an uplink radio resource may be transmitted. Alternatively, the RA MSG2 may be transmitted on a PDCCH or a physical downlink shared channel (PDSCH). In the case that a DCI is transmitted in the step S603, the corresponding DCI may include one or more among uplink resource allocation information (e.g., scheduling information), transmission timing adjustment information (e.g., a timing advance (TA) value, a TA command), transmission power adjustment information, backoff information, beam configuration information, TCI state information, configured scheduling (CS) state information, state transition information, PUCCH configuration information, an index of the RA MSG1 received in the step S602 (e.g., an index of the RA preamble), and uplink resource allocation information for transmission of an RA MSG3 in a step S604.

Here, the beam configuration information may be information indicating activation or deactivation of a specific beam. The TCI state information may be information indicating activation or deactivation of a specific TCI state. The CS state information or configured grant (CG) state information may be information indicating activation or deactivation of radio resources allocated in the CS scheme. The state transition information may be information indicating transition of the operation state of the terminal shown in FIG. 5. The state transition information may indicate transition from a specific operation state to the RRC idle state, the RRC connected state, or the RRC inactive state. Alternatively, the state transition information may indicate maintaining of the current operation state. The PUCCH configuration information may be allocation information of a scheduling request (SR) resource. Alternatively, the PUCCH configuration information may be information indicating activation or deactivation of an SR resource.

The base station may transmit the DCI instead of the RA MSG2 in the step S603. In this case, control information may be transmitted through a PDSCH. That is, the control information may include one or more among uplink resource allocation information (e.g., scheduling information), transmission timing adjustment information (e.g., TA value, TA command), transmission power adjustment information, backoff information, beam configuration information, TCI state information, CS state information, state transition information, PUCCH configuration information, the index of the message 1 (e.g., RA preamble) received in the step S602, and uplink resource allocation for transmission of an RA MSG3 in the step S604.

The base station may transmit scheduling information of the RA MSG2 to the terminal using a random access (RA)-RNTI. For example, a cyclic redundancy check (CRC) of the DCI including the scheduling information of the RA MSG2 may be scrambled by the RA-RNTI, and the corresponding DCI may be transmitted through the PDCCH. In addition, the base station may transmit the RA MSG2 using a cell-RNTI (C-RNTI). The base station may transmit the RA MSG2 on a PDSCH indicated by the scheduling information addressed by the scheduling identifier (e.g., RA-RNTI, C-RNTI). The terminal may receive the RA MSG2 from the base station. The terminal may transmit an RA MSG3 (i.e., message 3) including its own information to the base station (S604). The terminal information may include one or more among the identifier of the terminal, capability, property, mobility status, location information, a reason for the radio access, size information of uplink data (e.g., buffer status report (BSR)), connection configuration request information, and uplink data. In addition, in the step S604, the terminal may transmit information requesting information required by the terminal to the base station.

When the RA MSG2 is received based on the DCI in the step S603, the terminal may perform an operation according to the information element(s) included in the PDCCH (or DCI). The information element(s) included in the PDCCH (or DCI) may include one or more among transition request information of the operation state of the terminal, request information for maintaining the operation state of the terminal, information indicating activation or deactivation of a beam, information indicating activation or deactivation of a TCI state, information indicating activation or deactivation of a CS state. In this case, the random access procedure may be terminated without performing the step S604.

If the RA MSG2 is received based on the DCI, and an uplink radio resource for the RA MSG3 is not allocated in the step S603, the terminal may wait until allocation information of the uplink radio resource for the RA MSG3 is received. When the allocation information of the uplink radio resource for the RA MSG3 is received before a preconfigured timer expires, the terminal may transmit the RA MSG3 to the base station using the uplink radio resource. On the other hand, when the allocation information of the uplink radio resource for the RA MSG3 is not received until the preconfigured timer expires, the terminal may perform the random access procedure again. That is, the terminal may perform again from the step S602.

In a step S605, the base station may transmit downlink information requested by the terminal. Alternatively, the base station may transmit downlink data or a control message to the terminal. In the step S605, the base station may transmit the terminal identifier received from the terminal (e.g., the terminal identifier received in the step S604) to the terminal. A message 4 transmitted by the base station in the step S605 may be referred to as an 'RA MSG4'.

The base station may transmit resource allocation information (e.g., scheduling information) for transmission of the RA MSG3 to the terminal using the RA MSG2. The scheduling information may include one or more among the identifier of the base station transmitting the scheduling information, beam index, identifier for identifying the scheduling information, radio resource allocation information, MCS information, and resource allocation information for transmission of feedback information (e.g., ACK or NACK) indicating whether the scheduling information is received. The radio resource allocation information may include frequency domain resource allocation information (e.g., transmission band information, subcarrier allocation information) and/or time domain resource allocation information (e.g., frame index, subframe index, slot index, symbol index, transmission period, transmission timing).

In the random access procedure shown in FIG. 6, the RA MSG3 may include one or more of the following information elements.

Capability of the terminal
Properties of the terminal
Mobility state of the terminal
Location information of the terminal
Reason for attempting the access procedure (e.g., random access procedure)

The reason for attempting the access procedure may be a transmission request of system information according to a request of the terminal, transmission request of downlink data according to update of a firmware or essential software of the terminal, or uplink resource allocation request. The information indicating the reason for attempting the access procedure may be information capable of distinguishing the reason for performing the access procedure. The information capable of distinguishing the reason for performing the access procedure may be as follows.

Uplink resource allocation information
Handover request information or measurement result information
Terminal operation state transition (or, change) request information
Resumption information of a radio channel
Re-establishment information of a radio channel
Information related to beam sweeping, beam reconfiguration, or beam change for beam forming
Information related to physical channel synchronization acquisition
Update information of location information
Mobility state or buffer status report The terminal (e.g., the terminal operating in the RRC idle state or the RRC inactive state) may transmit small data and/or a small signaling message using the 4-step random access procedure shown in FIG. 6. The small signaling message may be a MAC signaling message (e.g., a control message of the MAC layer) or an RRC signaling message (e.g., a control message of the RRC layer). In order to perform the above-described operation, the terminal may transmit the RA MSG3 including the following information element(s).

- Identifier (ID) of the terminal
- Information informing a transmission request of an uplink small packet (or, small data and/or small signaling message)
- Information indicating an uplink data or the size of the uplink data (e.g., length indicator (LI)). The information indicating the size of the uplink data may indicate the size of MAC PDU or the number of MAC PDUs.
- Information indicating an uplink signaling message (e.g., uplink bearer message) and/or the size of the uplink signaling message (e.g., LI). The information indicating the size of the uplink signaling message may indicate the size of RRC message or the number of RRC messages.
- Logical channel identifier (e.g., LCID) of an uplink data bearer or an uplink signaling bearer
- Uplink buffer size information (e.g., BSR)
- Information indicating whether the size of the small packet meets a preconfigured condition
- Control message for connection configuration request
- Information requesting uplink resource allocation
- Measurement result of a radio channel
- Information on a desired terminal state after completion of transmission of the small packet The information indicating whether the size of the small packet meets a preconfigured condition may be information indicating whether the size of the small packet to be transmitted by the terminal is less than or equal to a preconfigured threshold. The base station may determine a size and/or MCS level of an uplink resource allocated to the terminal based on the information indicating whether the size of the small packet meets a preconfigured condition. Here, the threshold (e.g., a comparison reference value of the size of the small packet) may be preconfigured in the communication system according to a class of the terminal, the capability of the terminal, the type of the bearer, and/or the type (e.g., coverage) of the base station. Alternatively, the base station may determine the threshold according to the class of the terminal, the capability of the terminal, the type of the bearer, and/or the type (e.g., coverage) of the base station, and inform the determined threshold to the terminal by using system information, an RRC message, a MAC message (e.g., MAC CE), and/or a PHY message (e.g., DCI).

When the RA MSG3 includes the above-described information elements, a control field(s) indicating one or more among information indicating whether each information element is included, information on attribute(s) of the corresponding data (or, control information), and information on the size of the corresponding data (or, control information) may be configured in form of a MAC header, logical channel identifier (e.g., LCID), or MAC CE.

The terminal may transmit the small uplink packet through the random access procedure shown in FIG. 6. When transmission of the uplink small packet is required, the terminal operating in the RRC inactive state or the RRC idle state may trigger execution of the random access procedure shown in FIG. 6. When a condition preconfigured for transmission (e.g., intermittent transmission) of the uplink small packet is satisfied, the terminal may perform the step S602 using the RA MSG1 meeting the above-described condition.

In this case, the base station may configure the RA MSG1 for transmission of the uplink small packet (e.g., intermittent transmission) to be distinguished. For example, the RA MSG1 may be configured to be distinguished according to the size and/or type (e.g., form) of the uplink small packet to be transmitted by the terminal. The terminal may transmit the RA MSG1 configured for transmission of the uplink small packet. When the RA MSG1 is received from the terminal, the base station may transmit an RA MSG2 to the terminal in response to the RA MSG1. The RA MSG2 may include resource allocation information for transmission of an RA MSG3 including the uplink small packet.

As another exemplary embodiment, the base station may transmit uplink scheduling information for transmission of the uplink small packet to the terminal in a preconfigured period (e.g., a period or window preconfigured after the step S602 is performed). The uplink scheduling information may be transmitted on a physical layer control channel (e.g., PDCCH). In this case, a scheduling identifier may be an RA-RNTI or a dedicated scheduling identifier for small packet (e.g., small packet (SM)-RNTI). For example, a cyclic redundancy check (CRC) of a DCI including the uplink scheduling information of the small packet may be scrambled by the RA-RNTI or SM-RNTI. The SM-RNTI may be used for transmission of the small packet and/or transmission of the scheduling information of the small packet.

The terminal may identify the uplink scheduling information included in the RA MSG2 obtained using the RA-RNTI. Alternatively, the terminal may perform a monitoring operation on a downlink channel (e.g., PDCCH and/or PDSCH) using the SM-RNTI, and identify the uplink scheduling information included in a DCI obtained by the monitoring operation. The uplink scheduling information may be transmitted to the terminal using a PDCCH and/or a PDSCH. The terminal may transmit the small packet to the base station in a resource indicated by the uplink scheduling information. That is, the terminal may transmit the uplink small packet meeting the condition for small packet transmission to the base station in the step S604 by using the RA MSG3 according to the uplink scheduling information of the RA MSG2.

In case that the RA MSG1 for transmission (e.g., intermittent transmission) of the small packet is not configured to be distinguished, the terminal transmitting the RA MSG1 may receive the RA MSG2 according to the random access procedure shown in FIG. 6. The terminal may transmit control information to the base station by using the RA MSG3 for transmission of the small packet.

The base station may identify the control information included in the RA MSG3 of the step S604 or the control message (e.g., RRC control message and/or MAC control message) received after the random access procedure shown in FIG. 6. The control information may include BSR information, information indicating the size of the small packet, information indicating whether the size of the small packet meets a preconfigured condition, and/or information on a desired terminal state after completion of the transmission of the small packet. The base station may determine whether to transition the state of the terminal based on the control information. For example, when the terminal operating in the RRC inactive state or the RRC idle state can transmit an uplink packet (e.g., small packet) without a state transition, the base station may control (or, instruct) the terminal to transmit the uplink packet in the RRC inactive state. Alternatively, the base station may control (or instruct) the terminal that has completed the transmission of the uplink packet to transition to the RRC inactive state or the RRC idle state. Here, the uplink packet may be uplink data and/or uplink control information.

When the size of the uplink packet requested by the terminal to be transmitted is greater than or equal to the threshold, the base station may control (or instruct) the terminal to transmit the uplink packet after the terminal transitions to the RRC connected state. Alternatively, the base station may control (or instruct) the terminal performing a random access procedure to perform uplink communication or downlink communication after the terminal transitions to the RRC connected state or the RRC inactive state. In order to support the above operation, the base station may control or instruct the terminal performing a random access procedure to perform uplink communication or downlink communication after the terminal transitions to the RRC connected state or the RRC inactive state by transmitting a response message (e.g., RA MSG2) or a separate control message.

The base station may transmit uplink scheduling information of the small packet to the terminal in the step S604 or after the step S604. The uplink scheduling information may be transmitted on a PDCCH or PDSCH. In this case, the scheduling identifier may be the C-RNTI or SM-RNTI included in the RA MSG2 in the step S603. The terminal may obtain the uplink scheduling information using the C-RNTI or SM-RNTI, and transmit the small packet to the base station in a resource indicated by the uplink scheduling information.

In the step S604, the terminal may transmit a MAC control message including control information. In this case, information indicating whether the control information is present, a value of the control information, and/or a configuration parameter range may be transferred in form of a MAC subheader or header or in form of a MAC subPDU or MAC PDU. In order to support the above operation, a separate logical channel identifier may be configured.

Figure 7:
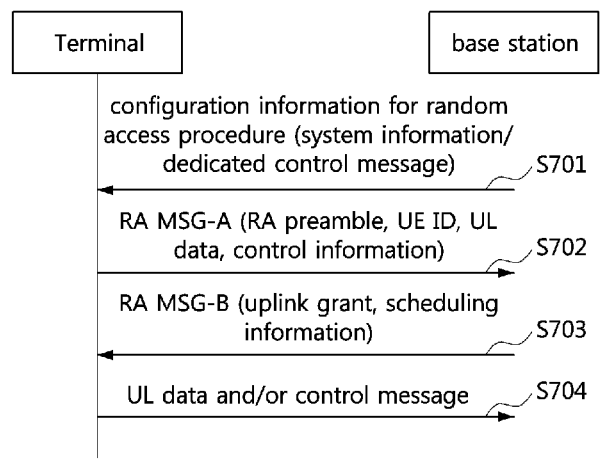
FIG. 7 is a sequence chart illustrating a second exemplary embodiment of a random access procedure in a communication system.

FIG. 7 is a sequence chart illustrating a second exemplary embodiment of a random access procedure in a communication system.

Referring to FIG. 7, a communication system may include a base station, a terminal, and the like. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. The base station and the terminal may be configured to be the same or similar to the communication node shown in FIG. 2. A random access procedure may be performed in two steps.

The base station may transmit system information and/or a control message including configuration information of a radio resource (e.g., uplink radio resource) for the random access procedure to the terminal (S701). The terminal may obtain the configuration information of the radio resource for the random access procedure by receiving the system information and/or the control message from the base station. Here, the control message may be a dedicated control message. The system information and/or dedicated control message may be the same as or similar to the system information and/or dedicated control message in the step S601 shown in FIG. 6.

The terminal may transmit an RA MSG-A to the base station using the radio resource configured by the base station (S702). The RA MSG-A may include an RA preamble and a terminal identifier (e.g., UE ID, C-RNTI). In addition, the RA MSG-A may further include uplink data and/or control information. In the 2-step random access procedure, a message 1 may be referred to as the 'RA MSG-A' or 'MSG-A', and the RA MSG-A may be distinguished from the RA MSG1 in the 4-step random access procedure.

The RA MSG-A may include an RA preamble and an RA payload. In the 2-step random access procedure, the RA preamble may be referred to as a '2-step-RA preamble', and in the 2-step random access procedure, the RA payload may be referred to as a '2-step-RA payload'. The RA preamble of the RA MSG-A may be selected by the MAC layer of the terminal. The RA payload of the RA-MSG-A may be generated by the MAC layer or the RRC layer. The RA preamble selected by the MAC layer of the terminal and the RA payload generated by the MAC layer or RRC layer of the terminal may be delivered to the physical layer. The RA payload of the RA MSG-A may include one or more among the terminal identifier (e.g., UE ID, C-RNTI), uplink data, and control information.

The control information may include a BSR, measurement result information (e.g., quality information), BFR request information, RLF report information, request information of RRC connection setup, request information of RRC connection re-establishment, resumption request information, and transmission request information of system information. When the CBRA procedure or the CFRA procedure is performed, the RA payload may include the terminal identifier. The uplink radio resource for transmission of the RA preamble may be configured independently of the uplink radio resource for transmission of the RA payload.

For example, the radio resources configured (or allocated) for the radio access procedure may be non-contiguous in the time domain or frequency domain. Alternatively, the radio resources configured (or allocated) for the radio access procedure may be contiguous in the time domain or frequency domain. The radio resources for the radio access procedure may be radio resources configured (or allocated) in different schemes. Alternatively, the radio resources for the radio access procedure may be radio resources defined by a different physical layer channel.

The expression that the radio resources for the radio access procedure are different may mean that one or more among the positions of the radio resources in the time domain or frequency domain, the indexes of the radio resources, the indexes of the RA preambles, the transmission timing, and the offsets are configured differently. The RA preamble or RA payload may be transmitted using different radio resources. For example, the RA preamble may be transmitted on a PRACH, and the RA payload may be transmitted on a physical uplink shared channel (PUSCH).

In order to configure the transmission resource for the RA preamble of the RA MSG-A differently from the transmission resource for the RA payload of the RA MSG-A, the uplink radio resource for transmission of the RA payload of the RA MSG-A (e.g., PUSCH configured for transmission of the RA payload of the RA MSG-A) may be configured to correspond to the RA preamble of the RA MSG-A. That is, a mapping relationship between the uplink radio resource for transmitting the RA preamble of the RA MSG-A and the uplink radio resource for transmitting the RA payload of the RA MSG-A may be configured.

For example, the transmission resource of the RA preamble may be mapped one-to-one with the transmission resource of the RA payload. In this case, one PRACH may be mapped to one PUSCH. Alternatively, a plurality of transmission resources of the RA preamble may be mapped to one transmission resource of the RA payload. In this case, a plurality of PRACHs may be mapped to one PUSCH. Alternatively, one transmission resource of the RA preamble may be mapped to a plurality of transmission resources of the RA payload. In this case, one PRACH may be mapped to a plurality of PUSCHs. In order to improve the reception quality of the RA payload, the RA payload may be repeatedly transmitted. The uplink radio resources for the repetitive transmission of the RA payload may be configured, and the corresponding uplink radio resources may be mapped to the transmission resources of the RA preamble.

For example, when the transmission resource of the RA MSG-A is preconfigured or when the RA preamble of the RA MSG-A is transmitted through a preconfigured region (or group), the base station may configure radio resources for the repetitive transmissions of the RA payload of the RA MSG-A. Therefore, when a coverage expansion function is applied or when a preconfigured reference condition is satisfied, the terminal may select RA preamble resources or RA preamble index for the repetitive transmissions of the RA payload, and may repeatedly transmit the RA payload based on the selected resource or index. The terminal may repeatedly transmit the RA payload using uplink radio resources mapped to the RA preamble index. The uplink radio resources (e.g., repeated radio resources) for transmission of the RA payload may be configured within a preconfigured period in the frequency domain or time domain. Information on a mapping relationship of the uplink radio resources for transmission of the RA MSG-A may be transmitted to the terminal through system information and/or an RRC message.

When the 2-step random access procedure is performed in a non-contention scheme, the transmission resources of the RA preamble and/or the RA payload of the RA MSG-A may be allocated dedicatedly to the terminal. In the CFRA procedure, resource information of the RA preamble configured dedicatedly for the terminal may include an SS/PBCH resource list, a CSI-RS resource list, an SS/PBCH index, a CSI-RS index, an RA preamble index, and the like. The transmission resource of the RA payload of the RA MSG-A may be determined based on the mapping relationship (e.g., one-to-one mapping relationship or many-to-one mapping relationship) between the transmission resource of the RA preamble and the transmission resource of the RA payload. In the CFRA procedure (e.g., 2-step CFRA procedure), the resource information of the RA payload configured dedicatedly for the terminal may include allocation information of an uplink radio resource, beam configuration information, MCS information, etc. for transmission of the RA payload.

In the 2-step random access procedure, the transmission resource of the RA preamble may be contiguous with the transmission resource of the RA payload in the time domain. The transmission resource of the RA payload may be allocated within a time window. The terminal performing the 2-step random access procedure may transmit the RA payload using a radio resource contiguous with the RA preamble. Alternatively, the terminal may transmit the RA payload by using a radio resource within the time window.

Alternatively, parameter(s) for allocation of the transmission resource of the RA preamble and the transmission resource of the RA payload may include a frequency offset and/or a time offset. Accordingly, the terminal may transmit the RA payload using a radio resource for the RA payload mapped to the RA preamble. Alternatively, the terminal may randomly select one or more radio resources among radio resources configured for transmission of the RA payload, and may transmit the RA payload using the selected radio resource(s).

The RA payload of the RA MSG-A transmitted in the step 702 may be configured to be the same or similar to the RA MSG3 transmitted in the step S604 shown in FIG. 6. For example, the RA payload of the RA MSG-A may include one or more among the identifier, capability, property, mobility state, and location information of the terminal, the reason for attempting the access procedure, request information of beam failure recovery, a measurement result on a base station (or cell) in the CA environment, request information of activation/deactivation of the CA, BWP switching request information, BWP deactivation/activation request information, uplink data (e.g., small packet), size of the uplink data (e.g., small packet), uplink buffer size information (e.g., BSR), control message for requesting connection configuration, information indicating whether the size of the uplink small packet meets a preconfigured condition, request information of uplink resource allocation, and a measurement result of a radio channel. The control information for transmission of the uplink small packet included in the RA MSG3 shown in FIG. 6 may be included in the RA payload of the RA MSG-A in FIG. 7. That is, the terminal may transmit the RA payload including control information for transmission of the uplink small packet to the base station.

When the RA payload is transmitted together with the RA preamble in the step 702, the RA payload may include one or more among the terminal identifier, uplink data, and control information. The attribute of the uplink data, the length of the uplink data, the attribute of the control information, the length of the control information, and whether the control information is included may be indicated by a MAC header, logical channel identifier (e.g., LCID), or MAC CE. For transmission timing adjustment (e.g., adjustment of a TA value) or transmission power control, the terminal may insert a preamble, pilot symbol, or reference signal in the first symbol or some symbols within the RA payload of the RA MSG-A.

The base station may receive the RA MSG-A from the terminal, and may obtain the RA preamble and RA payload included in the RA MSG-A. In addition, the base station may obtain one or more among the terminal identifier, uplink data, and control information from the RA payload. The base station may generate an RA MSG-B (e.g., message 2, RAR) in response to the RA MSG-A, and may transmit the RA MSG-B to the terminal (S703). The terminal may receive the RA MSG-B from the base station, and may identify information element(s) included in the RA MSG-B. The RA MSG-B may be referred to as a 'MSG-B'.

The RA MSG-B may include one or more among a backoff indicator (BI), uplink radio resource allocation information, the RA preamble (i.e., index of the RA preamble) of the RA MSG-A, transmission timing adjustment information (e.g., TA value or TA Command), scheduling identifier (e.g., C-RNTI, temporary cell (TC)-RNTI, etc.), and terminal identifier for contention resolution (e.g., contention resolution ID (CRID)).

The RA MSG-B (e.g., MAC PDU) may include one or more MAC subPDUs. Each of the one or more MAC subPDUs included in the RA MSG-B may be configured based on one of the following configuration schemes. Information indicating the configuration scheme of the MAC subPDU may be included in a MAC subheader of the corresponding MAC subPDU. The MAC subPDU may mean 'MAC sub PDU'.

Configuration scheme #1: a MAC subheader including a backoff indicator (BI)

Configuration scheme #2: a MAC subheader and a fallback RAR

Configuration scheme #3: a MAC subheader and a successful RAR

Configuration scheme #4: a MAC subheader and a MAC service data unit (SDU) (e.g., data or control information)

Configuration scheme #5: a MAC subheader and a padding

When the RA MSG-B is scheduled by the C-RNTI assigned to the terminal or when the RA MSG-B includes the terminal identifier (e.g., UE contention resolution ID) included in the RA MSG-A, the terminal may determine that the contention is resolved. That is, the terminal may determine that the 2-step random access procedure is completed.

When a CRC of DCI including scheduling information of the PDSCH on which the RA MSG-B (e.g., RAR for the RA MSG-A) is transmitted is scrambled by the C-RNTI, and the RA MSG-B including TA information and/or a UL grant is received within an RAR window (or before a timer expires), the terminal may determine that the contention for the 2-step random access procedure is resolved. Here, the TA information may be a TA value or a TA command.

A specific field (or bit) of the PDCCH (e.g., DCI or UCI) may indicate that the RA MSG-B scheduled by the PDCCH is an RA MSG-B scheduled by the C-RNTI. Alternatively, a field of the MAC subheader or a logical channel identifier (LCD) for transmission of the MAC CE for the RA MSG-B may indicate that the RA MSG-B scheduled by the PDCCH is an RA MSG-B scheduled by the C-RNTI.

In the 4-step random access procedure, the RAR window may start at the ending time point of the transmission of RA MSG1. In the 2-step random access procedure, the RAR window may start at the ending time point of the transmission of the RA payload of the RA MSG-A. When the RA MSG-B (e.g., RA MSG-B scheduled by the C-RNTI) including the TA information and/or UL grant is not received within the RAR window (or before a timer expires), the terminal may determine that the contention for the 2-step random access procedure is not resolved.

When the RA MSG-B scheduled by the C-RNTI is transmitted in response to the RA MSG-A in the 2-step random access procedure, the PDCCH (e.g., DCI or UCI) may include the TA information, indicator informing that the corresponding PDCCH includes scheduling information for a response to the RA MSG-A, and the like. The RA MSG-B may be transmitted in form of a MAC message (e.g., MAC CE) or an RRC message. When the RA MSG-B is transmitted in form of a MAC message, the RRC layer of the base station obtaining the information of the RA MSG-A may deliver parameter(s) to be included in the RA MSG-B to the MAC layer of the base station, and the MAC layer of the base station may generate the RA MSG-B in form of a MAC CE. The RA MSG-B may include the terminal identifier obtained through the RA payload of the RA MSG-A.

When the RA preamble of the RA MSG-A is allocated dedicatedly to the terminal or when the radio resource of the RA preamble of the RA MSG-A is mapped one-to-one with the radio resource of the RA payload of the RA MSG-A, the RA MSG-B may not include the index of the RA preamble received from the terminal.

When the RA preamble of the RA MSG-A is allocated dedicatedly to the terminal or when the RA payload of the RA MSG-A includes the scheduling identifier (e.g., C-RNTI) assigned to the terminal, the base station may transmit DCI including scheduling information for the transmission resource of the RA MSG-B to the terminal using the scheduling identifier assigned to the terminal. That is, a CRC of the DCI may be scrambled by the scheduling identifier assigned to the terminal. The terminal may receive the DCI using the scheduling identifier assigned to the terminal, obtain the scheduling information for the transmission resource of the RA MSG-B included in the DCI, and receive the RA MSG-B in the transmission resource indicated by the scheduling information.

In the step S703, the base station may transmit a PDCCH for scheduling an uplink radio resource, a PDCCH (e.g., DCI) for the RAR (e.g., RA MSG-B), or the RA MSG-B. The RA MSG-B may be transmitted on a PDSCH. When only the PDCCH is transmitted in the step S703, the corresponding PDCCH may include one or more among allocation information (e.g., scheduling information) of an uplink radio resource for the terminal, transmission timing adjustment information (e.g., TA information), transmission power adjustment information, backoff information, beam configuration information, TCI state information, CS state information, state transition information, PUCCH configuration information, the index of the RA preamble included in the RA MSG-A, and allocation information of a radio resource for transmission of the RA payload of the RA MSG-A.

The beam configuration information may be information indicating activation or deactivation of a specific beam. The TCI state information may be information indicating activation or deactivation of a specific TCI state. The CS state information may be information indicating activation or deactivation of radio resources allocated in the CS scheme. The state transition information may be information indicating transition of the operation state shown in FIG. 5. The state transition information may indicate transition from the current operation state to the RRC idle state, RRC inactive state, or RRC connected state. Alternatively, the state transition information may indicate maintaining the current operation state. The PUCCH configuration information may be allocation information of a transmission resource of an SR. Alternatively, the PUCCH configuration information may be information indicating activation or deactivation of a transmission resource of an SR.

The base station may transmit the control information described in the step S703 on a PDSCH by transmitting only the PDCCH. The control message transmitted on the PDSCH may include one or more among allocation information (e.g., scheduling information) of an uplink radio resource, transmission timing adjustment information (e.g., TA information), transmission power adjustment information, backoff information, beam configuration information, TCI state information, CS state information, state transition information, PUCCH configuration information, the index of the RA preamble included in the RA MSG-A, and allocation information of an uplink radio resource for transmission of uplink data and/or a control message in a step S704.

In the procedure for generating and transmitting the RA MSG-B, the base station may transmit the DCI including scheduling information for transmission of the RA MSG-B by using an RA-RNTI or the scheduling identifier (e.g., C-RNTI) assigned to the terminal. That is, the CRC of DCI may be scrambled by the RA-RNTI or the C-RNTI. The base station may transmit the RA MSG-B to the terminal using the PDSCH indicated by the DCI.

When the terminal successfully receives the RA MSG-B from the base station, the 2-step random access procedure may be terminated. The terminal receiving the RA-MSG B may transmit uplink data and/or a control message to the base station by using uplink scheduling information (e.g., scheduling information included in the RA-MSG B) (S704).

Information indicating whether the base station (or cell) allows the execution of the 2-step random access procedure and/or a condition for performing the 2-step random access procedure may be transmitted to the terminal through system information transmitted in a broadcast scheme, a control message transmitted in a multicast scheme, or a dedicated control message. The information indicating whether the base station (or cell) allows the execution of the 2-step random access procedure may be information indicating whether the base station allows the terminal located in a service area to attempt to access through the 2-step random access procedure, information indicating whether the base station restrict the access attempt of the terminal located in a service area through the 2-step random access procedure, or information indicating whether the base station partially restricts the access attempt of the terminal located in a service area through the 2-step random access procedure.

When the access attempt through the 2-step random access procedure is restricted, the base station may inform the terminal of a restriction condition of the 2-step random access procedure. When the access attempt through the 2-step random access procedure is partially restricted, the base station may inform the terminal of a partial restriction condition of the 2-step random access procedure. When the base station does not allow the 2-step random access procedure or when the restriction condition or the partial restriction condition of the 2-step random access procedure is met, the terminal may not attempt the 2-step random access procedure.

When an execution condition (e.g., allowance condition) of the 2-step random access procedure is met, the terminal may perform the 2-step random access procedure. For example, if a quality of a radio channel measured by the terminal is equal to or greater than a threshold (e.g., reference value) configured by the base station, the terminal may perform the 2-step random access procedure. When the quality of the radio channel measured by the terminal is less than a threshold configured by the base station, the terminal may perform the 4-step random access procedure. Alternatively, when the quality of the radio channel measured by the terminal is less than a threshold configured by the base station, the terminal may perform the 2-step random access procedure. When the quality of the radio channel measured by the terminal is greater than or equal to a threshold configured by the base station, the terminal may perform the 4-step random access procedure.

For example, the quality of the radio channel may be measured as a received signal strength indicator (RSSI), a received signal code power (RSCP), a reference signal received power (RSRP), or a reference signal received quality (RSRQ). Alternatively, the quality of the radio channel may be measured as other parameters (e.g., a reference parameter for measuring a quality of a radio section between the base station (or, cell or TRP) and the terminal).

The RA preamble (e.g., signature) of the RA MSG1 in the 4-step random access procedure may be configured to be the same as the RA preamble (e.g., signature) of the RA MSG-A in the 2-step random access procedure. In the procedure of generating the RA preamble of the RA MSG1 and the RA MSG-A, a code sequence may be generated using the same code generation formula.

Each of the index and the transmission resource of the RA preamble of the RA MSG1 in the 4-step random access procedure may be configured to be different from each of the index and the transmission resource of the RA preamble of the RA MSG-A in the 2-step random access procedure. The transmission resource of the RA preamble of the RA MSG1 may be configured to be distinguished from the transmission resource of the RA preamble of the RA MSG-A in the time and/or frequency domain. In the frequency domain, the transmission resource of the RA preamble may include one or more of frequency band information, PRB information, CRB information, subcarrier information, and beam information according to a beamforming technique. In the time domain, the transmission resource of the RA preamble may be configured or indicated in units of a radio frame, subframe, TTI, slot, mini-slot, symbol, or specific time interval. The base station may determine whether the 4-step random access procedure or the 2-step random access procedure is performed based on the RA preamble received from the terminal or the radio resource through which the RA preamble is received.

The terminal may perform a procedure for transmission (e.g., intermittent transmission) of an uplink small packet by using the random access procedure shown in FIG. 7. When transmission of an uplink small packet is required, the terminal operating in the RRC inactive state or the RRC idle state may trigger the transmission operation of the RA MSG-A of FIG. 7. When a preconfigured condition for transmission of the uplink small packet is met, the terminal may perform the step S702 for transmission of the RA MSG-A meeting the preconfigured condition. In this case, the terminal may transmit the RA payload including control information for transmission of the uplink small packet and/or the small packet.

The RA payload of the RA MSG-A may include one or more among transmission request information of the uplink small packet, information indicating the size of the uplink small packet (e.g., the size of MAC PDU and/or the size of RRC message), information indicating the number of uplink small packets (e.g., the number of MAC PDUs and/or the number of RRC messages), uplink buffer size information (e.g., BSR), control message for connection configuration request, indicating whether the size of the uplink small packet meets a preconfigured condition, uplink resource allocation request information, channel measurement result, and information on a desired terminal state after completion of the transmission of the small packet. When the above-described control information is transmitted using a MAC control message, information indicating whether the control information is present, a value of the control information, and/or a configuration parameter range may be transferred in form of a MAC subheader or header or in form or a MAC subPDU or PDU. In order to support the above operation, a separate logical channel identifier may be configured.

For transmission (e.g., intermittent transmission) of the uplink small packet, the RA preamble of the RA MSG-A may be configured to be distinguished. In this case, the terminal may select the RA preamble of the RA MSG-A according to the size and/or type (e.g., form) of the uplink small packet. That is, the terminal may transmit the uplink small packet meeting the condition for transmission of the small packet to the base station using the RA payload of the RA MSG-A in the step S702.

The base station may determine whether to transition the operation state of the terminal based on the control information included in the RA preamble of the RA MSG-A and/or the control message (e.g., RRC control message and/or MAC control message) received from the terminal after completion of the random access procedure. Here, the control information may be BSR information, information indicating the size of the uplink small packet, and/or information indicating whether the size of the uplink small packet meets a preconfigured condition.

For example, if the terminal operating in the RRC inactive state or the RRC idle state can transmit the uplink packet (e.g., small packet) without a state transition, the base station may control (or instruct) the terminal to transmit the uplink packet in the RRC inactive state or the RRC idle state. Alternatively, the base station may control (or instruct) the terminal that has completed transmission of the uplink packet to transition the operation state to the RRC inactive state or the RRC idle state. Here, the uplink packet may be uplink data and/or uplink control information.

When the size of the uplink packet requested by the terminal to be transmitted is greater than or equal to a threshold, the base station may control (or instruct) the terminal to transmit the uplink packet after the terminal transitions to the RRC connected state. Alternatively, the base station may control (or instruct) the terminal performing the random access procedure to perform uplink communication or downlink communication after the terminal transitions to the RRC connected state or the RRC inactive state. In order to support the above operation, the base station may control (or instruct) the terminal performing the random access procedure to perform uplink communication or downlink communication after the terminal transitions to the RRC connected state or the RRC inactive state by transmitting a response message (e.g., RA MSG-B) or a separate control message.

The base station may transmit uplink scheduling information of the small packet to the terminal in the step S704 or after the step S704. The uplink scheduling information may be transmitted on a PDCCH or PDSCH. In this case, a scheduling identifier may be the C-RNTI or SM-RNTI included in the RA MSG-B of the step S703. The terminal may obtain the uplink scheduling information by using the C-RNTI or SM-RNTI, and transmit the small packet to the base station in a resource indicated by the uplink scheduling information.

The small packet may be transmitted using a channel (e.g., uplink channel) preconfigured for transmission of the small packet instead of the random access procedure (e.g., RA message, channel) shown in FIG. 6 or 7. For example, the base station may configure a pre-allocated uplink resource (e.g., pre-allocated uplink resource (PUR)) for transmission of the small packet, and may transmit configuration information of the PUR to the terminal. The terminal may receive the configuration information of the PUR from the base station, and may transmit the small packet by using the PUR indicated by the configuration information. The PUR for transmission of the small packet may be configured (e.g., allocated) in a contention-based uplink channel or a contention-free uplink channel. The PUR may be preconfigured for transmission of a small packet. Alternatively, the PUR may be a resource (e.g., channel) allocated to a terminal, a terminal group, or a terminal existing (e.g., located) in a service area that satisfies a condition configured by the base station.

Similarly to the RA MSG-A in the 2-step random access procedure shown in FIG. 7, the PUR may be configured with a resource through which bit stream information (e.g., sequence information) having a preconfigured pattern in form of a preamble, reference signal, or pilot symbol is transmitted and/or an uplink channel (e.g., PUSCH) through which a small packet is transmitted. For example, the PUR may be configured with an uplink resource (e.g., uplink channel) through which symbols (e.g., signal) having a preconfigured pattern in form of a preamble, reference signal, or pilot symbol are transmitted. The preamble (or signal) may be configured to be located in the first symbol or the last symbol of the uplink channel in the time domain. The preamble (or signal) may be configured to be located in a specific subcarrier of the uplink channel in the frequency domain. The preamble (or signal) may be configured to be mapped to a specific RE(s) of the uplink channel in the time-frequency domain.

The configuration information of the uplink channel (e.g., PUR) for transmission of the small packet may include an index of the bit stream (e.g., sequence), PUSCH allocation information, MCS information, HARQ related information, transmission timing information, and/or RE mapping information of a reference signal (or preamble). The index of the bit stream (e.g., sequence) may mean identification information capable of distinguishing a corresponding bit stream (e.g., sequence), such as an index of the RA preamble or an index of the reference signal. The transmission timing information may mean a system frame number (SFN), a frame index, a subframe index, a slot index, a mini-slot index, or a symbol index for transmission of the small packet, an offset (e.g., offset for a SFN, frame, subframe, slot, mini-slot, or symbol) used to estimate a transmission time (or, transmission time point), and/or a transmission window size. The PUSCH allocation information may mean time domain allocation information and/or frequency domain allocation information of radio resources (e.g., physical resource block (PRB)) constituting the PUR.

The configuration information of the PUR for transmission of the small packet may be preconfigured (e.g., allocated) for each terminal or terminal group. Alternatively, the base station may transmit a signaling message (e.g., signaling message for transmission of system information) including the configuration information of the PUR for transmission of the small packet to the terminal. When the PUR is allocated to a terminal or a terminal group, a control message for connection configuration or a control message for state transition (or connection release) may include the configuration information of the PUR for transmission of the small packet.

The PUR and/or PUSCH resource for transmission of the small packet may be configured as one or more PRBs using consecutive radio resources. Here, the plurality of PRBs may be PRBs spaced apart in the time domain and/or the frequency domain. When a small packet occurs in the terminal, the terminal may transmit the small packet to the base station using a preconfigured PUR (e.g., PRB(s) of the PUR) or a PUR (e.g., PRB(s) of the PUR) allocated by the base station.

When the terminal desires to transmit an uplink small packet by using the PUR, the terminal may transmit one or more information elements (e.g., control information) among transmission request information of the uplink small packet, the size of the uplink small packet (e.g., MAC PDU size and/or RRC message size), information indicating the number of small uplink packets (e.g., the number of MAC PDUs and/or the number of RRC messages), uplink buffer size information (e.g., BSR information), control message for connection configuration request, information indicating whether the size of the uplink small packet meets a preconfigured condition, uplink resource allocation request information, channel measurement result, and/or a desired terminal state after completion of transmission of the small packet. When the above-described control information is included in a MAC control message, information indicating when \the control information is present, a value of the control information, and/or a configuration parameter range may be transferred in form of a MAC subheader or header or in form or a MAC subPDU or PDU. In order to support the above operation, a separate logical channel identifier may be configured.

If one or more of the following conditions are met, a method of transmitting a small packet using a PUR described above, a method of transmitting a small packet in the 4-step random access procedure shown in FIG. 6, and/or a method of transmitting a small packet in the 2-step random access procedure shown in FIG. 7 may be used.

Condition #1: a case when the size of the small packet is less than or equal to a preconfigured size (e.g., several bytes or tens of bytes)

Condition #2: a case when the channel measurement result satisfies a preconfigured condition (e.g., reference condition for small packet transmission)

Condition #3: a case when the service type of the small packet (e.g., quality of service (QoS) flow, bearer type) satisfies a preconfigured condition Condition #4: a case when a logical channel identifier, bearer identifier, or QoS flow ID is associated with the small packet Condition #5: a case when a transmission timing of the uplink small packet satisfies a preconfigured condition Condition #6: a case when the small packet is for emergency service Meanwhile, the base station may perform transmission (e.g., intermittent transmission) of a downlink small packet using a paging procedure (e.g., paging message, paging channel). Alternatively, the base station may transmit the small packet to a terminal (or, terminal group) using a downlink channel (e.g., pre-allocated downlink resource (PDR)) preconfigured (e.g., allocated) for transmission of the small packet.

The small packet may be transmitted in a paging procedure based on a paging-RNTI (P-RNTI). In this case, the base station may perform a transmission operation of control information indicating downlink reception, transmission operation of scheduling information for downlink reception, and/or transmission operation of a downlink small packet by using a channel (or, message) for the paging procedure.

When a small packet is transmitted using the PDR, scheduling information for a channel for transmission of the small packet (e.g., a field included in the DCI) may further include control information indicating downlink reception (e.g., monitoring of the PDR). Alternatively, the base station may transmit scheduling information for downlink reception on a PDCCH and/or PDSCH in order to transmit the small packet. The base station may transmit the small packet on a downlink channel (e.g., PDSCH).

Figure 8:
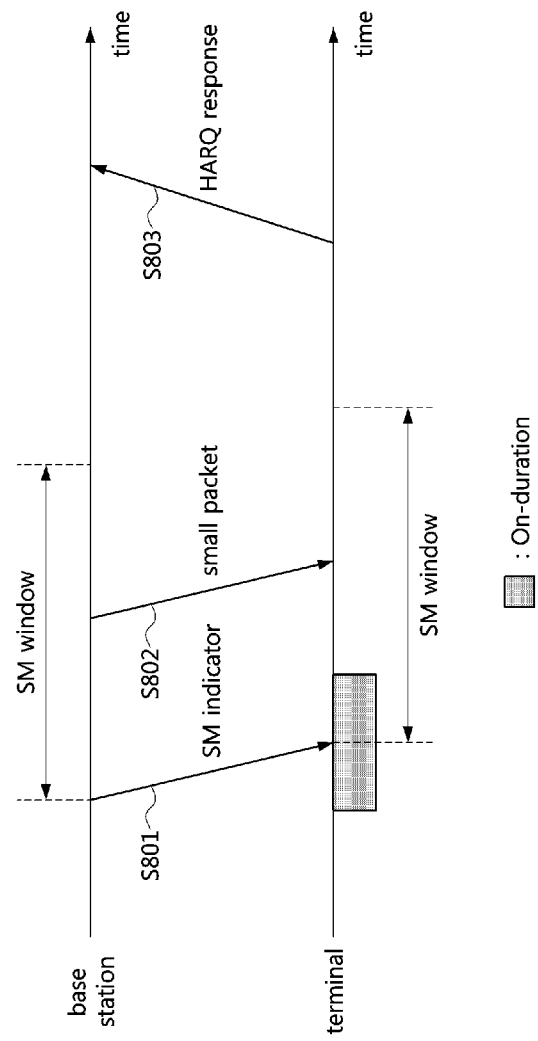
FIG. 8 is a timing diagram illustrating a first exemplary embodiment of a method of transmitting and receiving a small packet in a communication system.

FIG. 8 is a timing diagram illustrating a first exemplary embodiment of a method of transmitting and receiving a small packet in a communication system.

Referring to FIG. 8, a communication system may include a base station, a terminal, and the like. The base station may be the base station 110-1, 110-2, 110-3, 120-1, or 120-2 shown in FIG. 1, and the terminal may be the terminal 130-1, 130-2, 130-3, 130-4, 130-5, or 130-6 shown in FIG. 1. The base station and the terminal may be configured to be the same or similar to the communication node shown in FIG. 2.

The base station may generate an SM indicator (e.g., SM_Ind) indicating presence of downlink data and/or signaling message. The downlink data and/or signaling message may be a small packet. The base station may transmit the SM indicator to the terminal (S801). The SM indicator may be transmitted within an SM window (e.g., transmission window). The terminal may receive the SM indicator from the base station, and may determine that a small packet (e.g., downlink data and/or signaling message) to be transmitted to the terminal exists in the base station based on the SM indicator. The SM indicator may be included in a DCI, and the DCI including the SM indicator may be transmitted on a PDCCH. The CRC of the DCI including the SM indicator may be scrambled by a P-RNTI or SM-RNTI. The SM-RNTI in the paging procedure may be the same as the SM-RNTI for uplink transmission in the random access procedure. Alternatively, a separate SM-RNTI may be configured for a paging channel (e.g., paging channel (PCH)) for receiving a small packet, receiving PDR configuration information, or transmitting a small packet.

In order to transmit a downlink small packet or to indicate transmission of the downlink small packet by using a paging message or PDR, a reception periodicity (e.g., monitoring periodicity, reception occasion, monitoring occasion) of a DCI having a CRC scrambled (or masked) by an RNTI (e.g., P-RNTI, SM-RNTI, C-RNTI, semi-persistent scheduling (SPS)-RNTI, CG-RNTI) and/or a PDCCH resource (e.g., control resource set (CORESET), search space)) may be configured for each terminal or terminal group. The above-described configuration information (e.g., configuration information of the DCI reception periodicity, configuration information of the PDCCH resource) may be transmitted in a combination of one or more among system information, dedicated control message, RRC control message, MAC control message, and PHY control message.

The CRC of the DCI including the SM indicator may be scrambled by the P-RNTI or SM-RNTI, and the PDCCH monitoring periodicity (e.g., PDCCH monitoring occasion) for the DCI including the SM indicator may be indicated by a modulo operation between 'the terminal identifier (or, terminal group identifier) and/or PDCCH monitoring periodicity' and time information (e.g., SFN). The PDCCH monitoring periodicity for the DCI including the SM indicator may be configured in units of an SFN, frame, subframe, slot, mini-slot, or symbol. The configuration information of the PDCCH monitoring periodicity may include an index of a time resource, offset for a time resource, and/or time window size (e.g., a time window value, a time window length). The index of the time resource may be an index of an SFN, frame, subframe, slot, mini-slot, or symbol. The offset for the time resource may be an offset for an SFN, frame, subframe, slot, mini-slot, or symbol.

The PDCCH resource through which the DCI having the CRC scrambled by the P-RNTI or SM-RNTI is transmitted may be estimated (or, configured) based on a parameter and/or a subcarrier offset indicating a specific location in the frequency domain by using a terminal identifier (or terminal group identifier) and/or a PDCCH monitoring periodicity. The base station may transmit configuration information of the parameter to the terminal by using a combination of one or more of system information, dedicated control message, RRC control message, MAC control message, and PHY control message. The terminal (or terminal group) may receive the DCI by performing a monitoring operation according to a preconfigured periodicity and/or on the PDCCH resource (e.g., CORESET, search space), and when the DCI includes the SM indicator, the terminal (or terminal group) may determine that a small packet is to be transmitted. Accordingly, the terminal may perform a small packet reception operation.

The SM indicator may be transmitted in form of a bit or a bitmap. In this case, some bits (e.g., reserved bits) of a short message for a paging procedure, which is transmitted on a PDCCH associated with the P-RNTI, may be configured as the SM indicator. Alternatively, a field included in the DCI (e.g., the DCI related to the P-RNTI) may be configured as the SM indicator.

In another exemplary embodiment, some bits of the control information transmitted on the PDCCH associated with the C-RNTI or SM-RNTI may be configured as the SM indicator. Alternatively, a field included in the DCI (e.g., the DCI associated with the C-RNTI or SM-RNTI) may be configured as the SM indicator. In another exemplary embodiment, information transmitted on the PDCCH associated with the SM-RNTI may indicate that a small packet is to be transmitted.

In the SM indicator configured in form of a bitmap, each bit of the bitmap may be set to distinguish a terminal group, a terminal type, and/or a service type of the small packet. Alternatively, in the SM indicator, a correspondence relationship between each bit of the bitmap and (the terminal group, the terminal type, and/or the service type of small packet) may be defined.

The base station may transmit the small packet using a paging channel (e.g., PCH) or a PDR (e.g., downlink-shared channel (DL-SCH)) (S802). In this case, a CRC of a DCI including scheduling information of a PDSCH through which the small packet is transmitted may be scrambled by a P-RNTI or SM-RNTI. The scheduling identifier for transmission of the small packet may be preconfigured in the communication system. Alternatively, the base station may configure a scheduling identifier for transmission of a small packet for each terminal or terminal group, and may indicate the scheduling identifier to the terminal (or terminal group) by using a combination of one or more among system information, dedicated control message, RRC control message, MAC control message, and PHY control message.

The paging message or downlink scheduling information for transmission of the small packet may be transmitted in the PDR. For example, the downlink scheduling information of the small packet may be transmitted on a PDSCH (or PDR) indicated by a DCI having a CRC scrambled (or masked) by an RNTI (e.g., P-RNTI, SM-RNTI, C-RNTI, SPS-RNTI, CG-RNTI). Alternatively, the DCI having the CRC scrambled (or masked) by the RNTI (e.g., P-RNTI, SM-RNTI, C-RNTI, SPS-RNTI, CG-RNTI) may include the downlink scheduling information of the small packet. In this case, the DCI may include the SM indicator as well as the downlink scheduling information of the small packet. The DCI indicating that control information (e.g., bit) indicating downlink reception is valid may include the downlink scheduling information of the small packet. When the control information indicating downlink reception is not valid, the DCI may include the scheduling information for transmission of a paging message irrelevant to transmission of the small packet.

For transmission of the paging message or the small packet, the small packet may be transmitted in the PDR. For example, the base station may transmit the small packet to the terminal in the PDCCH associated with an RNTI (e.g., P-RNTI, SM-RNTI, C-RNTI, SPS-RNTI, CG-RNTI) or the PDSCH indicated by the DCI having the CRC scrambled (or, masked) by the RNTI (e.g., P-RNTI, SM-RNTI, C-RNTI, SPS-RNTI, CG-RNTI) (S802).

The control information transmitted through the PDCCH and/or PDSCH for transmission of the downlink small packet may include one or more information elements among the following information elements.

Information indicating downlink reception
Small packet attribute information
Downlink transmission timing information
Configuration information and/or index information of a BWP for transmission of the small packet
Beam configuration information, TCI state information, and/or TCI state activation/deactivation indication information for transmission of the small packet
Time domain allocation information and/or frequency domain allocation information
MCS information
HARQ related information
Repetitive transmission related information
CFRA configuration information
Information on a desired terminal state after completion of reception of the downlink small packet When the attribute information of the small packet is transmitted in a MAC control message, information indicating presence of the corresponding control information (e.g., small packet attribute information), a value of the control information, and/or a configuration parameter range may be transferred in form of a MAC subheader or header or in form of a MAC subPDU or PDU. In order to support the above operation, a separate logical channel identifier may be configured.

The small packet attribute information may include one or more among small packet bearer identification information (e.g., information indicating whether the bearer is a signaling radio bearer (SRB) or a data radio bearer (DRB), bearer ID, etc.), logical channel identifier (e.g., LCID), QoS Flow ID, information indicating the size of the small packet, information indicating the number of messages constituting the small packet (e.g., the number of MAC PDUs and/or the number of RRC messages), source identifier of the small packet (e.g., L2 or higher layer identifier, IP address, port number), and target identifier of the small packet (e.g., L2 or higher layer identifier, IP address, port number).

The downlink transmission timing information may include an index of a time resource in which the small packet is transmitted, an offset for estimating the time resource in which the small packet is transmitted, and/or time window information (e.g., SM window (i.e., reception window) size). The index of the time resource may be an index of an SFN, frame, subframe, slot, mini-slot, or symbol. The offset for estimating the time resource may be an offset for an SFN, frame, subframe, slot, mini-slot, or symbol. The time window (e.g., SM window, reception window) may be a time period in which downlink communication is possible from the reception time of the RNTI (e.g., P-RNTI or SM-RNTI) or the reception time of the SM indicator. The time window may be configured as a timer value.

The HARQ related information may be configuration information for transmitting a HARQ response for the small packet received in the paging procedure or the PDR. The HARQ related information may include one or more among a HARQ process identifier, resource configuration information of a PUCCH and/or PUSCH for transmission of the HARQ response, resource configuration information of a PUCCH and/or PUSCH for HARQ retransmission, and HARQ retransmission timing information.

The repetitive transmission related information may refer to control information required when the small packet transmitted in the paging procedure is repeatedly transmitted to improve reliability. The CFRA configuration information may mean configuration of an RA MSG1 and/or an RA MSG-A for a CFRA procedure when it is necessary to perform a random access procedure together with the transmission procedure of the small packet according to the paging operation or when it is necessary to perform a random access procedure regardless of the transmission procedure of the small packet according to the paging operation.

The base station may transmit the SM indicator to the terminal based on the above-described method (S801), and may transmit the small packet associated with the SM indicator to the terminal based on the above-described method (S802). The SM indicator and the small packet may be transmitted within the SM window (e.g., transmission window). The SM window may start from the transmission time point of the SM indicator. For example, the timer for the SM window may operate from the transmission time point of the SM indicator. The terminal (e.g., terminal operating in the RRC inactive state or the RRC idle state) may receive the SM indicator from the base station by performing a PDCCH monitoring operation in an on-duration. The on-duration may be referred to as an 'active time' and may be configured by the base station.

The terminal may receive the small packet from the base station by performing a downlink channel monitoring operation within the SM window (e.g., reception window). Here, the monitoring operation may be performed on the resource indicated by the downlink scheduling information received from the base station. The SM window may start from the reception time point of the SM indicator. For example, the timer for the SM window may operate from the reception time point of the SM indicator. When the SM window ends (e.g., when the timer for the SM window expires), the terminal may not perform the downlink channel monitoring operation.

The terminal may transmit the HARQ response (e.g., ACK or NACK) for the small packet to the base station (S803). The transmission operation of the HARQ response for the small packet may be performed according to the configuration of the base station. The base station may receive the HARQ response for the small packet from the terminal, and may determine whether to retransmit the small packet based on the HARQ response.

The transmission of the HARQ response for the small packet received in the paging procedure may be performed using an RA preamble of the CFRA procedure. For example, an RA preamble #1 corresponding to ACK and an RA preamble #2 corresponding to NACK may be preconfigured in the communication system. Alternatively, the base station may configure the RA preamble #1 corresponding to ACK and the RA preamble #2 corresponding to NACK, and may transmit configuration information of the RA preambles #1 and #2 to the terminal. The configuration information of the RA preambles #1 and #2 may be transmitted to the terminal using a combination of one or more among system information, RRC control message, MAC control message, and PHY control message. The configuration information of the RA preambles #1 and #2 may be included in a control message transmitted through a PDCCH or PDSCH in the paging procedure, a control message for connection configuration, and/or a control message for state transition (e.g., connection release).

The terminal may receive the configuration information of the RA preambles #1 and #2 from the base station. When the small packet is successfully received (e.g., when decoding of the small packet is successful), the terminal may transmit the RA preamble #1 corresponding to ACK to the base station. When the RA preamble #1 is received from the terminal, the base station may determine that the decoding of the small packet in the terminal is successful. On the other hand, when the reception of the small packet fails, the terminal may transmit the RA preamble #2 corresponding to NACK to the base station. When the RA preamble #2 is received from the terminal, the base station may determine that the reception of the small packet at the terminal has failed.

The base station may inform the terminal of whether to receive the downlink small packet by transmitting the SM indicator before a preconfigured time offset from a paging occasion (PO). For example, the SM indicator according to the above-described method may be transmitted before the preconfigured offset from a paging occasion (e.g., a start time or end time of the paging occasion) configured for the terminal or the terminal group. The terminal may receive the SM indicator before the preconfigured offset from the paging occasion (e.g., the start time or the end time of the paging occasion). In this case, the terminal may perform the reception operation of the downlink small packet according to the method described above in the corresponding paging occasion. On the other hand, the terminal may not receive the SM indicator at the above-described time point (e.g., the time point before the preconfigured offset from the paging occasion). In this case, the terminal may not perform the operation of receiving the small packet and/or the paging message in the corresponding paging occasion.

For the transmission of the above-described SM indicator, the following parameter(s) may be configured. The base station may transmit the following parameter(s) to the terminal using a combination of one or more among system information, dedicated control message, RRC control message, MAC control message, and PHY control message.

Time offset indicating the transmission time point of the SM indicator related to the paging occasion Transmission period of the SM indicator CORESET configuration information for transmission of the SM indicator (e.g., CORESET identifier, CORESET resource index, and/or CORESET configuration periodicity)

Configuration information of the SM window (e.g., transmission window, reception window)

When the small packet is generated by the base station or the terminal, the base station and the terminal may perform a new connection configuration procedure. In this case, a small packet transmission/reception procedure may be performed between the terminal operating in the RRC connected state and the base station. Alternatively, the base station may transmit the small packet to the terminal (e.g., the terminal operating in the RRC inactive state or the RRC idle state) on a downlink channel (e.g., paging channel or PDR) without performing a state transition operation. The terminal (e.g., the terminal operating in the RRC inactive state or the RRC idle state) may transmit the small packet to the base station in an uplink channel (e.g., random access channel or PUR) without performing a state transition operation.

The base station may transmit the configuration information for transmission of the small packet to the terminal using a combination of one or more among system information, dedicated control message, RRC control message, MAC control message, and PHY control message. Here, the dedicated control message may be a message transmitted in a state transition procedure of the terminal. The configuration information for transmission of the small packet may include PUR resource allocation information (e.g., time domain allocation information and/or frequency domain allocation information), PDR resource allocation information for transmission of the small packet (e.g., time domain allocation information and/or frequency domain allocation information), MCS information, and/or HARQ-related information. The configuration information for transmission of the small packet may be transmitted to a specific terminal or a specific terminal group. Alternatively, the configuration information for transmission of the small packet may be transmitted to terminal(s) located in a service area that meets a condition configured by the base station.

The radio resources for the PUR and/or the PDR may be preconfigured. Alternatively, the PUR and/or PDR may be located within a preconfigured BWP. In this case, the configuration information of the PUR and/or PDR may include a BWP index indicating the BWP in which the PUR and/or PDR is located. In the communication system, a default BWP or an initial BWP may be used as the BWP for the PUR and/or PDR. Alternatively, a dedicated BWP for the PUR and/or PDR may be configured in the communication system. In the above-described case(s), the configuration information of the PUR and/or PDR may not include the BWP index. When a dedicated BWP for the PUR and/or PDR is configured, the base station may transmit configuration information of the dedicated BWP for the PUR and/or PDR to the terminal by using a combination of one or more among system information, dedicated control message, RRC control message, MAC control message, and PHY control message.

In the above-described small packet transmission procedure, an encryption function according to the radio layer protocol may not be applied. Alternatively, in the above-described small packet transmission procedure, the encryption function according to the radio layer protocol may be limitedly used. For example, an encryption function using an encryption key may not be applied to the small packet transmission procedure, and an integrity protection function to check integrity of a transmitted message may be applied to the small packet transmission procedure.

In the present disclosure, the radio channel quality may be a channel state indicator (CSI), a received signal strength indicator (RSSI), a reference signal received power (RSRP), a reference signal received quality (RSRQ), or a signal to interference and noise ratio (SINR). With respect to the operation of the timer defined or described in the present disclosure, although operations such as start, stop, reset, restart, or expire of the defined timer are not separately described, they mean or include the operations of the corresponding timer or a counter for the corresponding timer.

In the present disclosure, the base station (or cell) may refer to a node B (NodeB), an evolved NodeB, a base transceiver station (BTS), a radio base station, a radio transceiver, an access point, an access node, a road side unit (RSU), a radio remote head (RRH), a transmission point (TP), a transmission and reception point (TRP), or a gNB. In addition, the base station (or, cell) may a CU node or a DU node to which the functional split is applied.

In the present disclosure, the terminal may refer to a UE, a terminal, an access terminal, a mobile terminal, a station, a subscriber station, a mobile station, a portable subscriber station, a node, a device), an Internet of Thing (IoT) device, or a mounted apparatus (e.g., a mounted module/device/terminal or an on-board device/terminal).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method of a terminal, the method comprising:
receiving a radio resource control (RRC) connection release message including pre-allocated uplink resource-small data transmission (PUR-SDT) configuration information and a logical channel identifier (LCID) for a SDT from a base station;
determining whether one or more conditions for the SDT are satisfied; and
when the one or more conditions are satisfied, performing the SDT in an uplink resource indicated by the PUR-SDT configuration information.

2. The method according to claim 1, wherein, when the RRC connection release message is received, an operating state of the terminal is transitioned from a RRC connected state to a RRC idle state or a RRC inactive state, and the SDT is performed by the terminal operating in the RRC idle state or the RRC inactive state.

3. The method according to claim 1, wherein the one or more conditions include a data volume threshold and a channel quality threshold.

4. The method according to claim 3, wherein the determining whether one or more conditions for a SDT are satisfied comprising:
determining whether a volume of small data to be transmitted from the terminal to the base station is less than or equal to the data volume threshold; and
determining whether a channel quality between the terminal and the base station is equal to or greater than the channel quality threshold.

5. The method according to claim 1, wherein information of the one or more conditions for the SDT is included in the RRC connection release message.

6. The method according to claim 1, wherein the PUR-SDT configuration information includes at least one of information of the uplink resource, information of a bearer of the SDT, or timing information of the SDT.

7. The method according to claim 1, wherein a transmission window starts at a time of the SDT, a size of the transmission window is configured by the base station, and the SDT is not performed after end of the transmission window.

8. The method according to claim 1, wherein the uplink resource is configured in a bandwidth part (BWP) configured by the base station, and configuration information of the BWP is included in the RRC connection release message.

\* \* \* \* \*